US011824670B2

(12) United States Patent
Jin et al.

(10) Patent No.: US 11,824,670 B2
(45) Date of Patent: Nov. 21, 2023

(54) ADAPTIVE BACKGROUND IN VIDEO CONFERENCING

(71) Applicant: Cisco Technology, Inc., San Jose, CA (US)

(72) Inventors: Zhaoyi Jin, Hefei (CN); Hongling Cen, San Jose, CA (US); Bhargavkumar Ghanshyamlal Pandya, Dublin, CA (US); Yasi Xi, Hefei (CN); Sebastian Jeuk, San Jose, CA (US); Maria Soledad Palmero, Toledo (ES); Gonzalo Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/699,835

(22) Filed: Mar. 21, 2022

(65) Prior Publication Data
US 2023/0299988 A1    Sep. 21, 2023

(51) Int. Cl.
| | |
|---|---|
| *G06F 3/048* | (2013.01) |
| *H04L 12/18* | (2006.01) |
| *G06F 3/04815* | (2022.01) |
| *G06F 3/0482* | (2013.01) |

(52) U.S. Cl.
CPC ........ *H04L 12/1813* (2013.01); *G06F 3/0482* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 8,458,597 B1 * | 6/2013 | Tijssen | H04L 67/06 715/753 |
| 11,061,547 B1 | 7/2021 | Fieldman | |

(Continued)

OTHER PUBLICATIONS

David Ball, "Introducing Immersive View, A Fun New Way to Meet," Zoom Blog, https://blog.zoom.us/introducing-zoom-immersive-view/, Apr. 26, 2021, 5 pages.

(Continued)

*Primary Examiner* — Thanh T Vu
(74) *Attorney, Agent, or Firm* — Edell, Shapiro & Finnan, LLC

(57) ABSTRACT

Methods are provided in which a collaboration server connects at least two participants via respective user devices to a collaboration session. The collaboration server further distributes, to the respective user devices, media stream data and one or more customized graphical items that are distinguishably displayed in the collaboration session. The one or more customized graphical items are displayed in a foreground or a background associated with a collaboration space of first participant of the at least two participants. The collaboration server further detects a selection, by one of the respective user devices, of a graphical item from the one or more customized graphical items displayed in the collaboration space and performs at least one action associated with the graphical item during the collaboration session based on detecting the selection of the graphical item.

20 Claims, 17 Drawing Sheets

(56) References Cited

U.S. PATENT DOCUMENTS

2014/0325396 A1* 10/2014 Sterman ............... H04N 7/147
                                                    715/756
2015/0334142 A1   11/2015 Gottlieb
2016/0349965 A1* 12/2016 Griffin ............... H04L 65/403
2017/0021273 A1*  1/2017 Rios ................. G06F 3/04842

OTHER PUBLICATIONS

"Immersive Share on Desk Series," Webex, Nov. 4, 2021, 2 pages.
"Stunnin Video Presentations, Simply Produced," Mmhmm, https://www.mmhmm.app/, retrieved Dec. 8, 2021, 8 pages.
Jason Johnston, "Adding Zoom motion background videos—Fun for video conferencing or education!" YouTube, https://www.youtube.com/watch?v=FXZ5Vpys5gM, Apr. 2, 2020, 3 pages.
"Embedded Apps Overview," Cisco, retrieved Dec. 8, 2021, 8 pages.
"Embedded Apps Overview," Cisco, retrieved Mar. 1, 2022, 8 pages.
"How to Use a Video Background on Zoom," Vyond, https://www.vyond.com/resources/zoom-virtual-background-video-guide/, May 11, 2021, 14 pages.

* cited by examiner

ADAPTIVE BACKGROUND IN VIDEO CONFERENCING

TECHNICAL FIELD

The present disclosure generally relates to online meeting space environments.

BACKGROUND

Virtual meeting space environments and video conferencing are popular. Video conferencing typically involves a group of geographically remote participants joining an online meeting via respective user devices for collaboration and content sharing. During video conferencing, video streams of participants are displayed in substantially real-time. Depending on positioning of a participant's camera, a portion of the participant's physical space (foreground and/or background) may also be displayed during the video conferencing. Sometimes participants switch to virtual backgrounds as opposed to a physical background for privacy and/or other reasons. In these cases, participants are displayed in a virtual space that may be selected by the participant for the video conference.

DESCRIPTION OF EXAMPLE EMBODIMENTS

Overview

Figure 1:
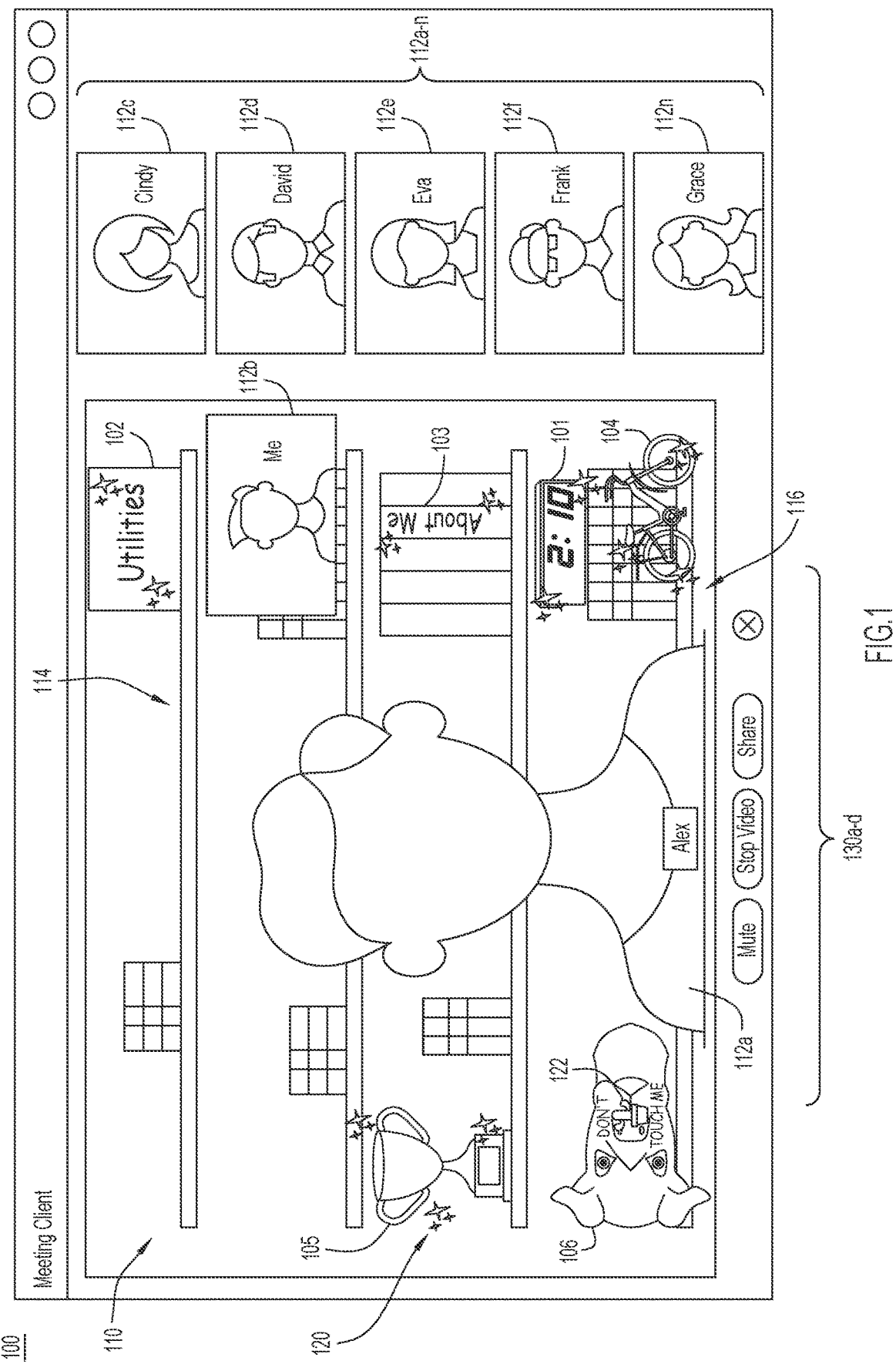
FIG. 1 is a diagram illustrating a collaboration session in which customized graphical items are presented in a collaboration space of a participant, according to an example embodiment.

Techniques presented herein provide various customized graphical items and/or actionable objects in a collaboration space during a collaboration session.

In one form, a collaboration server connects at least two participants via respective user devices to a collaboration session. The collaboration server distributes, to the respective user devices, media stream data and one or more customized graphical items that are distinguishably displayed in the collaboration session. The one or more customized graphical items are displayed in a foreground or a background associated with a collaboration space of a first participant of the at least two participants. The collaboration server detects a selection, by one of the respective user devices, of a graphical item from the one or more customized graphical items displayed in the collaboration space and performs at least one action associated with the graphical item during the collaboration session based on detecting the selection of the graphical item.

In another form, a collaboration server connects at least two participants via respective user devices to a collaboration session and detects, in a background of a collaboration space, at least one element contextually relevant to the collaboration session by contextually analyzing media stream data of the collaboration session. The collaboration server then generates at least one actionable object based on this element and provides this at least one actionable object in the collaboration space during the collaboration session.

EXAMPLE EMBODIMENTS

In an online meeting space environment, participants and/or users (these terms are used interchangeably throughout the description) are participating via their respective devices that may be geographically remote from each other. The participant and the respective user (client) device, such as a computer, laptop, tablet, smart phone, etc., may collectively be referred to as endpoints or user devices. The user devices may communicate with each other via one or more networks such as the Internet, virtual private network (VPN), and so on.

The user devices typically have interactive connectivity in a collaboration session. Interactions may include, but are not limited to, manipulating a user interface screen to jump to a particular location, zooming, making changes to the actual items and/or objects being displayed such as adding, deleting, and/or editing items and/or objects on the user interface screen, and so on.

Collaboration session or an online video conference typically involves two or more participants being connected via their respective user devices in real-time for collaboration. During a collaboration session, the participants are displayed in their respective collaboration spaces. A collaboration space is a space or environment of a respective participant. A collaboration space includes a foreground (space in front of the participant) and a background (space behind the participant). For example, a collaboration space may include a part of a participant's desk and office background (e.g., wall, painting, a bookcase, etc.).

A collaboration space may be a physical space (real environment of a participant) or a virtual space. For privacy and/or other reasons, participants may blur all or portion(s) of their real physical environment or replace it with an image. For example, a participant may be displayed at a beach, on a mountain, in an imaginary office setting with other participants therein, etc.

In existing solutions, the collaboration space (real or virtual background) is not used to support the collaboration session. While some form of a canvas or a whiteboard may be provided during a collaboration session, for content sharing, the collaboration space is not utilized to its potential. Techniques presented herein provide for sharing information or collaborating using the background and/or foreground of a collaboration space such that participants may show content in improved ways, share their personalities, be more engaged, and/or provide a more entertaining experience during the collaboration session. Specifically, a mechanism is provided for generating customized graphical items and/or actionable items that are added to a collaboration space for use by one or more participants, as detailed below.

In one example embodiment, customized graphical items are included in a collaboration space of one or more participants during a collaboration session. The customized graphical items may trigger various events or an execution of one or more actions. Specifically, a selection of a graphical item displayed in a collaboration space by one of the participants may result in displaying a user interface with additional information associated with a graphical item, the participant in the collaboration space, or contextual information related to the collaboration session. For example, additional information may include a profile or personal information of the participant, content related tools to be used during a collaboration session, contextual models, documents, etc. A selection of a graphical item may trigger a chain of actions such as playing a trick or surprise.

In another example embodiment, a smart background engine (adaptive background engine) analyzes the collaboration space of one or more participants to determine contextually relevant elements and generates respective actionable objects. Generating actionable objects may include converting a textual element into a modifiable text, converting an image into an image that may be manipulated and/or modified, adding a link to provide additional information associated with a contextually relevant element, etc. In other words, the smart background engine detects contextually relevant elements in the collaboration space and transforms them into actionable objects.

FIGS. 1-8 illustrate examples of collaboration sessions in which various customized graphical items are provided, according to various example embodiments. These customized graphical items are just some non-limiting examples and types and numbers of customized graphical items vary widely depending on use case scenarios.

A collaboration server connects multiple participants 112a-n via their respective user devices to a collaboration session. The collaboration session includes media streams of the participants in their respective collaboration space, which may be physical or virtual. FIGS. 1-8 depict a collaboration space 110 of a first participant 112a ("Alex"). The participants 112a-n further include a second participant 112b ("me"), a third participant 112c ("Cindy"), a fourth participant 112d ("David"), a fifth participant 112e ("Eva"), a sixth participant 112f ("Frank"), and a seventh participant 112n ("Grace"). The collaboration space 110 of the first participant 112a is depicted from a perspective or view of the second participant 112b. However, it is understood that other participants may have their own customized graphical items in their respective collaboration spaces and may also manipulate customized graphical items of other participants.

The notations "a-n", "a-d", "a-f", "a-g", "a-k", "a-c", and the like denote that a number is not limited, can vary widely, depends on a particular use case scenario, and need not be the same, in number. Moreover, this is only examples of various collaboration sessions and collaboration spaces, and the number and types of sessions and spaces may vary based on a particular deployment and use case scenario.

In FIGS. 1-8, the collaboration space 110 is a physical or virtual background. Physical background is the physical space or environment around the first participant 112a that is included in a media stream of the first participant 112a but is not limited thereto. The collaboration space 110 may be a virtual background. The collaboration space 110 (physical or virtual) includes a background 114 and a foreground 116. For example, the collaboration space 110 depicts the first participant 112a in an office space with the background 114 including a bookcase and the foreground 116 including a desk.

Specifically, FIG. 1 is a diagram illustrating a collaboration session 100 in which customized graphical items are presented in the collaboration space 110 of the first participant 112a, according to an example embodiment. The customized graphical items 101-106 may be generated by one or more collaboration servers and/or a client application being executed on a user device of the first participant 112a. The customized graphical items 101-106 are in the collaboration space 110 of the first participant 112a. The customized graphical items 101-106 include a timer 101, a utilities tool box 102, a profile 103 (about me) of the first participant 112a, a contextual model 104 (a bicycle), a trophy icon 105, and a surprise icon 106 (dog mask). These are but some non-limiting examples of the customized graphical items 101-106 and other images, icons, text, symbol(s), character(s), and/or number(s) may be used as customized graphical items 101-106.

The customized graphical items 101-106 are depicted in a distinguishable manner in the collaboration space 110. The distinguishable manner may include but is not limited to highlighting, underlining, color-coding, circling, or putting one or more characters or symbols in a proximity of a customized graphical item. The distinguishable manner may further vary based on a type of the customized graphical item. Specifically, customized graphical items that provide additional information about the participant are distinguishably displayed in one manner, while customized graphical items that relate to the collaboration session 100 itself are distinguishably displayed in another manner, and customized graphical items that are associated with multiple actions such as a surprise or a trick in yet another manner.

In the collaboration session 100, the timer 101, the utilities tool box 102, the profile 103, the contextual model 104, and the trophy icon 105 are distinguishably displayed by being surrounded with sparks 120 to indicate that they are clickable such that one or more actions are performed based on being selected and/or that they trigger one or more events. The surprise icon 106 is distinguishably displayed by including a warning icon 122 (a cactus with a warning message "don't touch me").

The customized graphical items 101-106 are positioned within the collaboration space 110 in the background 114 and/or the foreground 116. The customized graphical items 101-106 are customized and configured by the first participant 112a. The first participant 112a may customize the collaboration space 110 by including one or more of these customized graphical items 101-106 and by setting action(s) that are to be performed when a particular graphical item is selected and by defining their size, style, color, etc. That is, the customized graphical items 101-106 are configured to perform one or more actions or to trigger an event(s) in response to being selected by one of the participants 112a-n. The actions may include default actions such as counting by a timer, enlarging, etc. or user-defined actions such as dancing, shaking the selected graphical item, transforming it to another one, etc.

Collaboration meeting tools 130a-d allow the second participant 112b to control the respective view of the collaboration session 100. For example, the second participant may use the collaboration meeting tools 130a-d to view a collaboration space of another participant, to select a graphical item, to share a document, mute, record, stop own video feed, etc.

With continued reference to FIG. 1, FIGS. 2-6B are diagrams illustrating collaboration sessions in which various actions are performed, based on selections of the customized graphical items 101-106. Actions involve displaying additional information related to the first participant 112a of the collaboration space 110, displaying contextual information or content for the collaboration session, providing content related tools, and/or performing other actions such as playing a surprise or a trick on the second participant 112b, according to various example embodiments.

Figure 2:
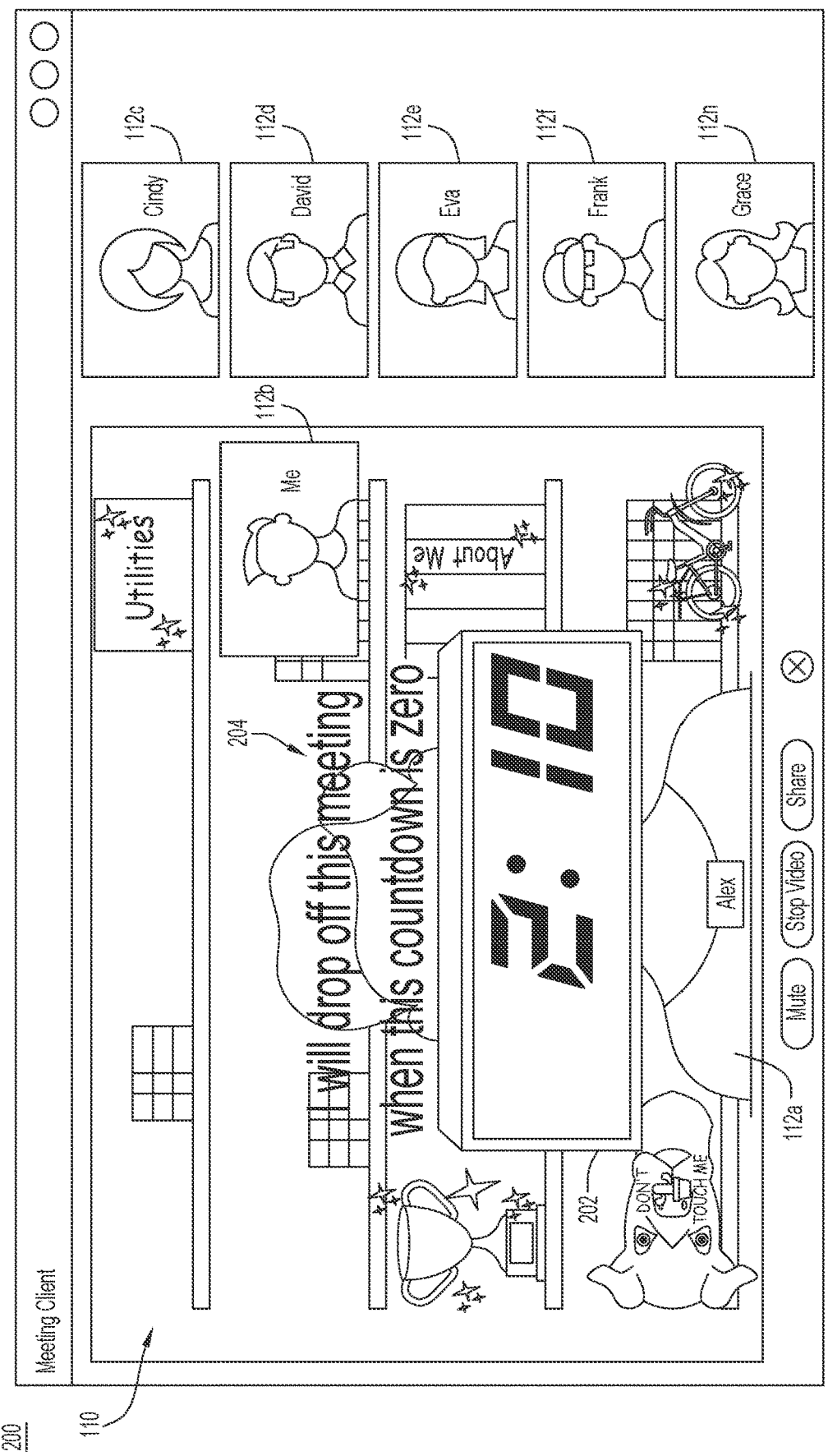
FIG. 2 is a diagram illustrating a collaboration session in which additional information associated with a selected graphical item is presented, according to an example embodiment.

Specifically, FIG. 2 is a diagram illustrating a collaboration session 200 in which additional information is presented in response to the second participant 112b selecting, via a respective user device, the timer 101 in FIG. 1, according to an example embodiment.

The first participant 112a may have other meetings to attend before the collaboration session 200 is scheduled to end. Therefore, the first participant 112a customizes or sets the timer 101 based on when the first participant 112a will need to leave the collaboration session 200 and adds the customized timer 101 to the collaboration space 110. The timer 101 is configured to show how much time is left before the first participant 112a will leave the collaboration session 200 (indicates availability duration of the first participant 112a). The timer 101 may further be configured to alarm the first participant 112a when it is time to leave the collaboration session 200.

In the collaboration session 200, when the second participant 112b selects, by clicking via the respective user device, the timer 101 in the collaboration space 110 of the first participant 112a, one or more actions associated with the timer 101 are performed. Specifically, an enlarged timer 202 is displayed in the collaboration space 110 or the enlarged timer 202 is displayed in a separated user interface such as a popup window. The enlarged timer 202 shows how much time is left before the first participant 112a will leave the collaboration session 200 (availability duration for the collaboration session 200 of the first participant 112a). Additionally, a timer message 204 is displayed indicating that the first participant 112a will leave the collaboration session 200 when the countdown is zero. The timer 101 may be programmed with a countdown for various reasons and the timer message 204 may be generated by the first participant 112a for various different events such as when the first participant 112a will be presenting in the collaboration session 200, when the first participant 112a will finish presenting in the collaboration session 200, etc. These are just a few non-limiting examples.

Referring back to FIG. 1, when the utilities tool box 102 is selected, a user interface, in a form of a popup window (not shown), may be displayed with various links to contextual information related to the collaboration session. The contextual information may include a set of wiki links to various relevant sites, documents, user interface tools, and/or any other tools that are to be used in the collaboration session 200 such as a whiteboard, pencil, etc.

Figure 3:
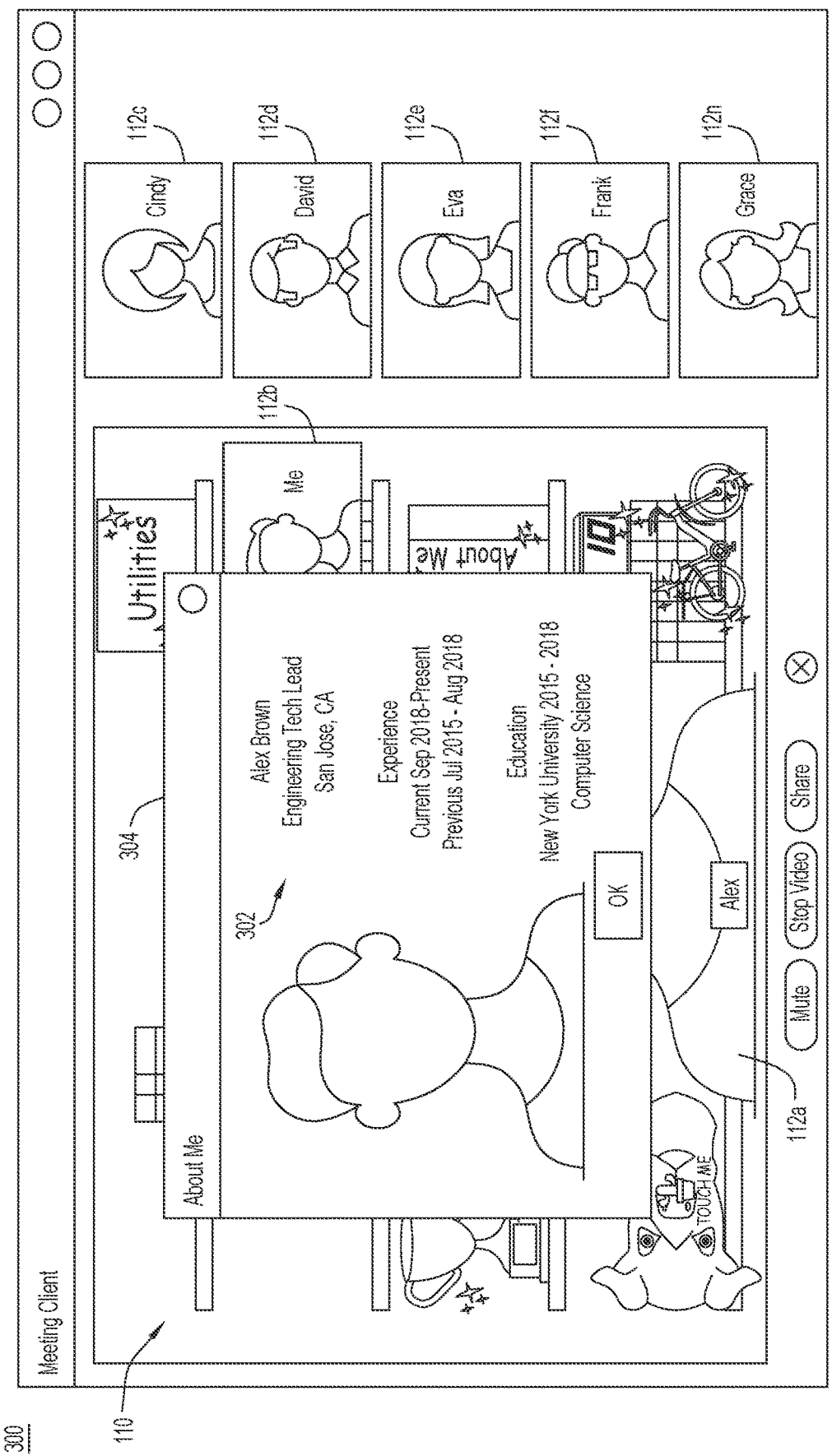
FIG. 3 is a diagram illustrating a collaboration session in which participant information associated with another selected graphical item is presented, according to an example embodiment.

FIG. 3 is a diagram illustrating a collaboration session 300 in which additional information about the first participant 112a is presented in response to a selection of the profile 103 in FIG. 1, according to an example embodiment.

If one of the participants 112a-n selects the profile 103 e.g., by clicking the profile icon using the respective user device, then a user profile 302 of the first participant 112a is presented in the collaboration session 300. As a result, any of the participants 112a-n may learn additional information about the first participant 112a during the collaboration session 300. The user profile 302 may be presented in a separate user interface 304 and include information such as title, experience, education, authored publications, memberships, leadership positions, etc.

Figure 4:
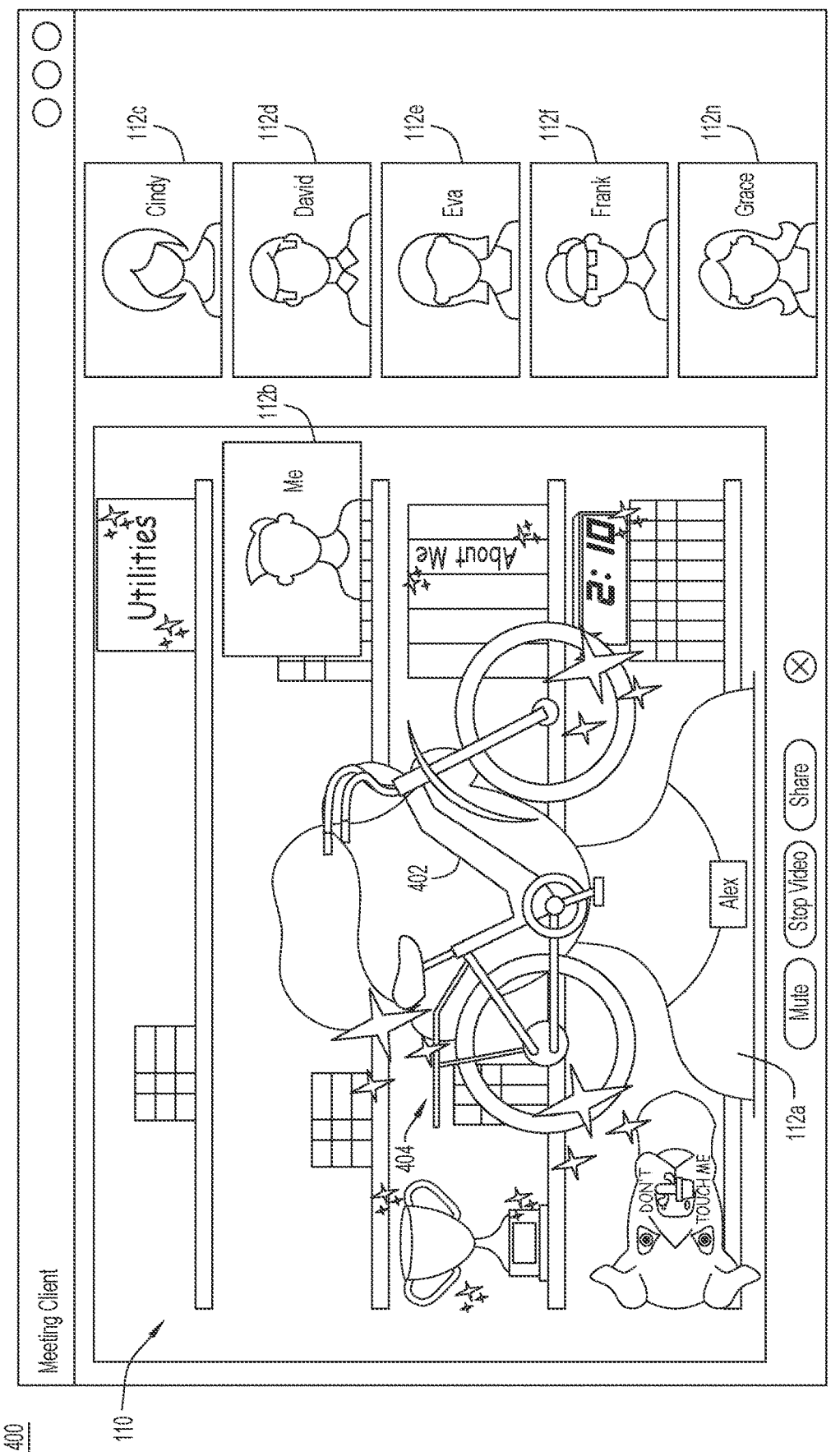
FIG. 4 is a diagram illustrating a collaboration session in which contextual information related to a collaboration session is presented in response to a selection of yet another graphical item, according to an example embodiment.

FIG. 4 is a diagram illustrating a collaboration session 400 in which contextual information is presented in response to a selection of the contextual model 104 in FIG. 1, according to an example embodiment.

In the collaboration session 400, the second participant 112b selected the contextual model 104 in FIG. 1, and obtained an enlarged model 402 in a foreground 404 of the collaboration space 110. The enlarged model 402 is an actionable model that may be manipulated, edited, scaled, rotated, adjusted, etc. The enlarged model 402 is the context of the collaboration session 400 such that the enlarged model 402 is discussed in the collaboration session 400. Accordingly, any of the participants 112a-n may select the contextual model 104 in FIG. 1. In response thereto, the enlarged model 402 is provided in the collaboration space 110 such that the second participant 112b may familiarize with the content or context of the collaboration session 400. The second participant 112b may manipulate and/or modify the enlarged model 402. By way of an example, the enlarged model 402 is a 3D model of a bicycle but the enlarged model 402 may be any material or contextual information for the collaboration session 400 such as a molecular model for a medicine related collaboration session, etc.

Figure 5:
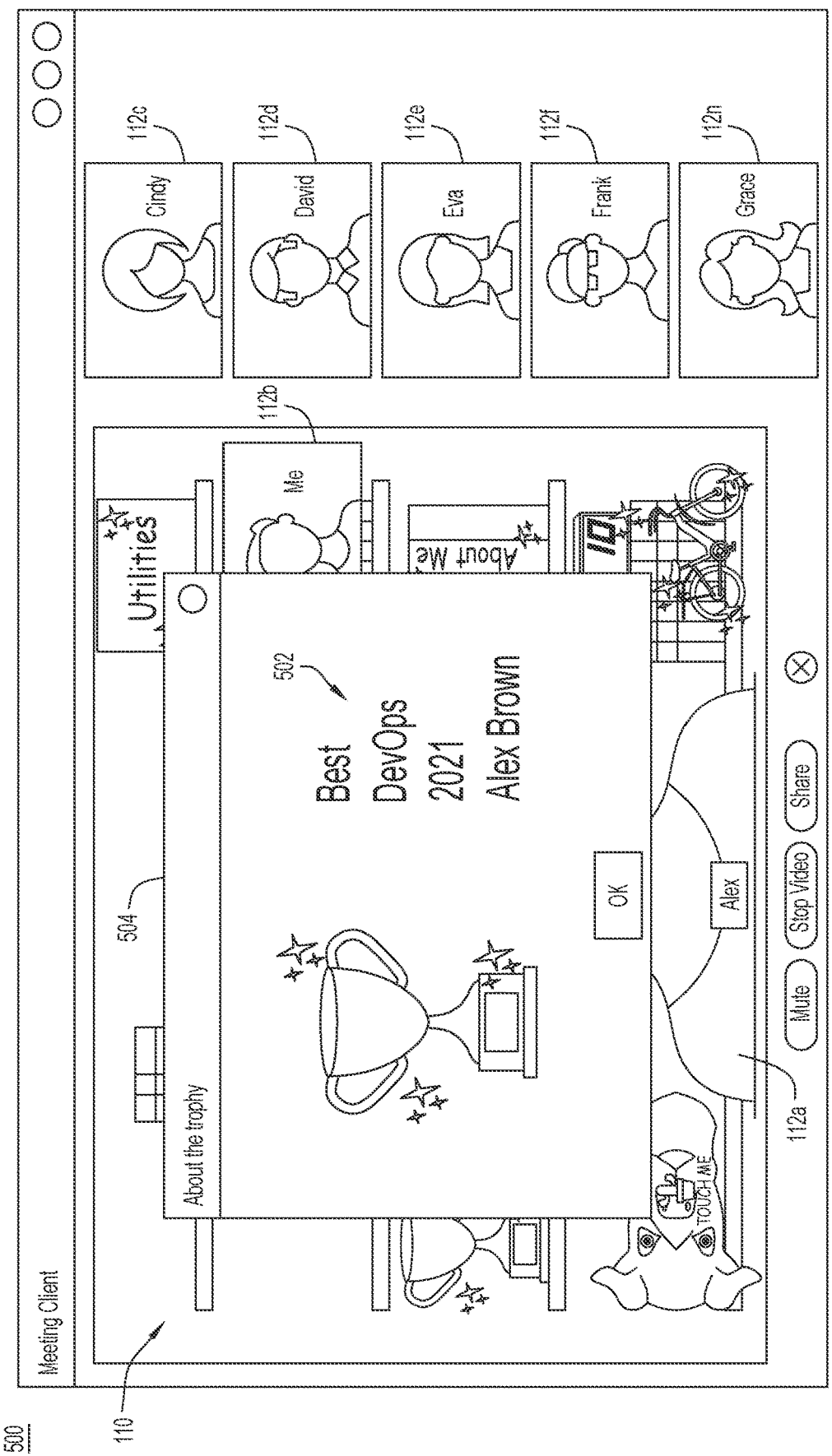
FIG. 5 is a diagram illustrating a collaboration session in which personal information about a participant is presented based on a selection of yet another graphical item, according to an example embodiment.

FIG. 5 is a diagram illustrating a collaboration session 500 in which personal information about a participant is presented in response to a selection of the trophy icon 105 in FIG. 1, according to an example embodiment.

In the collaboration session 500, the second participant 112b selects the trophy icon 105 in FIG. 1. In response thereto, personal information 502 about the first participant 112a is presented in the collaboration space 110. For example, the personal information includes an award obtained by the first participant 112a and information about the award such as purpose (for best development and IT operations (DevOps)) and date (2021). The personal information 502 is provided in a separate user interface 504. This is but one non-limiting example to share aspects of the personality of the first participant 112a in the collaboration session 500.

Figure 6A:
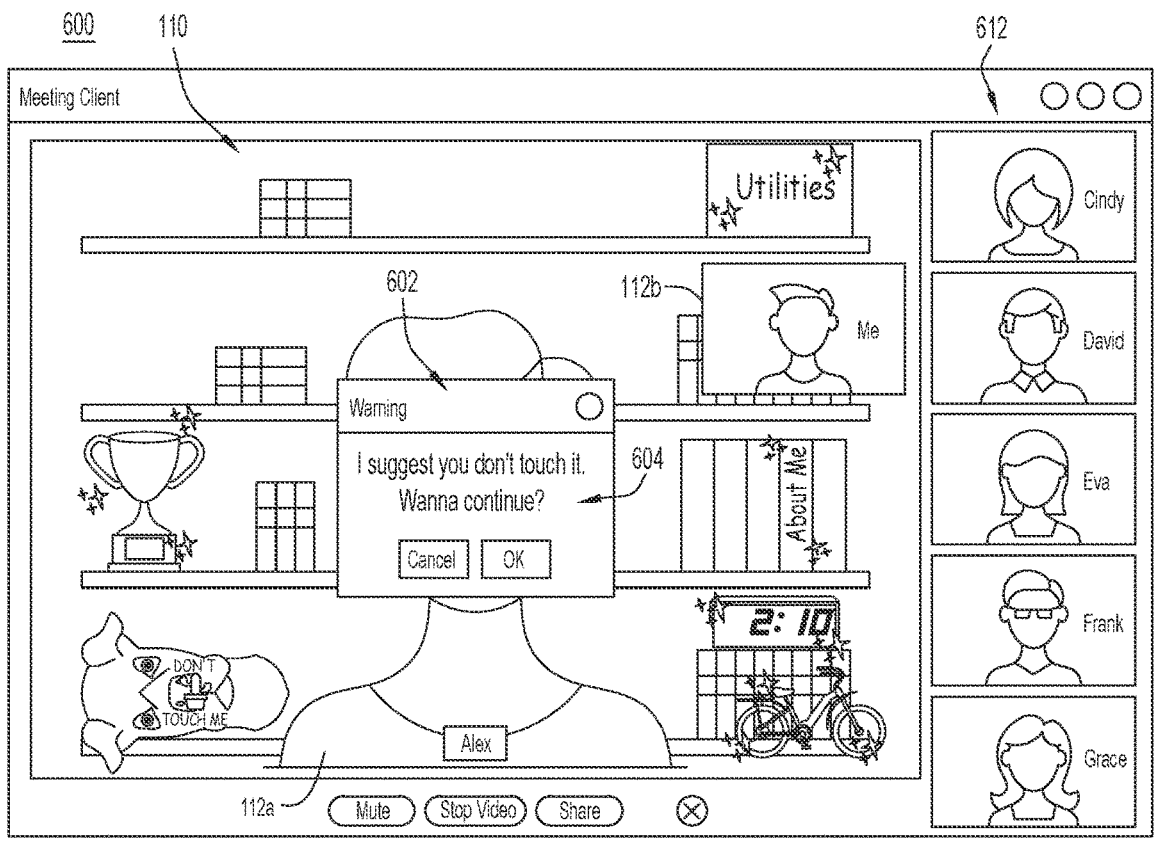
FIGS. 6A and 6B are diagrams illustrating a collaboration session in which multiple actions are performed based on a selection of another graphical item, according to an example embodiment.
Figure 6B:
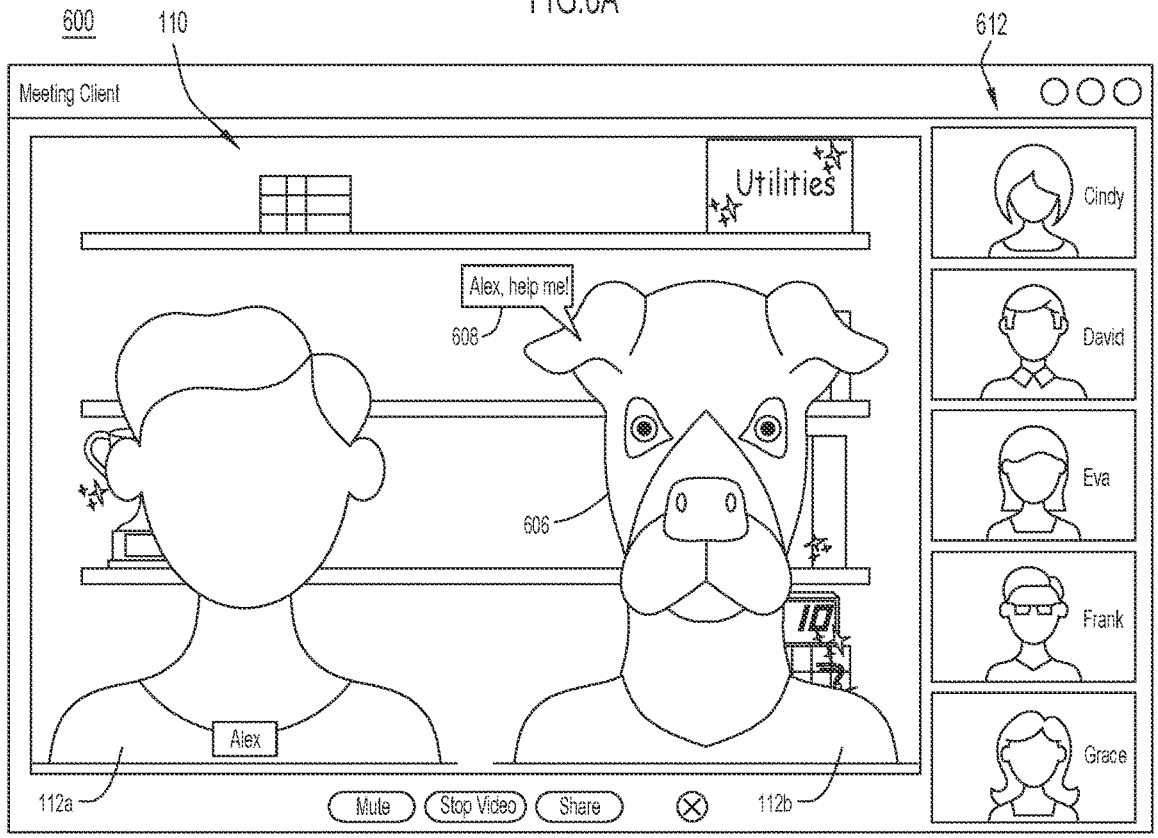

FIGS. 6A and 6B are diagrams illustrating a collaboration session 600 in which multiple actions are performed based on a selection of the surprise icon 106, according to an example embodiment.

In the collaboration session 600, the second participant 112b selects the surprise icon 106 in FIG. 1, and in response thereto, multiple actions are performed. Specifically, a warning message 602 is displayed in a separate user interface 604 shown in FIG. 6A. By way of an example, the warning message 602 may be "I suggest you don't touch me. Wanna continue?"

If the second participant 112b selects to continue, second action(s) are performed shown in FIG. 6B. By way of a non-limiting example, the second action(s) may involve a surprise or a trick such as moving the first participant 112a to one side of the collaboration space 110 to make room for the second participant 112b being depicted next to the first participant 112a in the collaboration space 110, and/or putting a dog mask 606 on a face of the second participant 112b. In other words, an image of the second participant 112b is extracted from the media stream of the collaboration session 600 associated with the second participant 112b and is overlaid on a virtual background of the first participant 112a. Additionally, one or more messages 608 may be displayed in the collaboration space 110 such as "Alex, help me!" From the perspective of other participants such as the third participant 112c, the second participant 112b was in a separate video grid in a video list panel 612 shown in FIG. 6A. The second participant 112b then disappears from the video list panel 612 and appears in the collaboration space 110 of the first participant 112a shown in FIG. 6B.

The second action(s) may further involve not allowing the second participant 112b to manipulate the view to remove the mask and/or to move out of the collaboration space 110 until the first participant 112a dismisses the trick. When the first participant 112a dismisses the trick, the second participant 112b returns to the separate video grid in the video list panel 612.

In one example embodiment, only some of these actions are performed. When the first participant 112a is in a physical background, it may be difficult to move the view of the first participant 112a (adjust the live video stream) to move the first participant 112a in the collaboration space 110. As such, the dog mask 606 covers the face of the second participant 112b in his own view displayed in the video list panel 612. The dog mask 606 is overlaid on the video stream of the second participant 112b at a location of the face. This is but one example of triggering multiple events or actions when a customized graphical item is selected.

Figure 7:
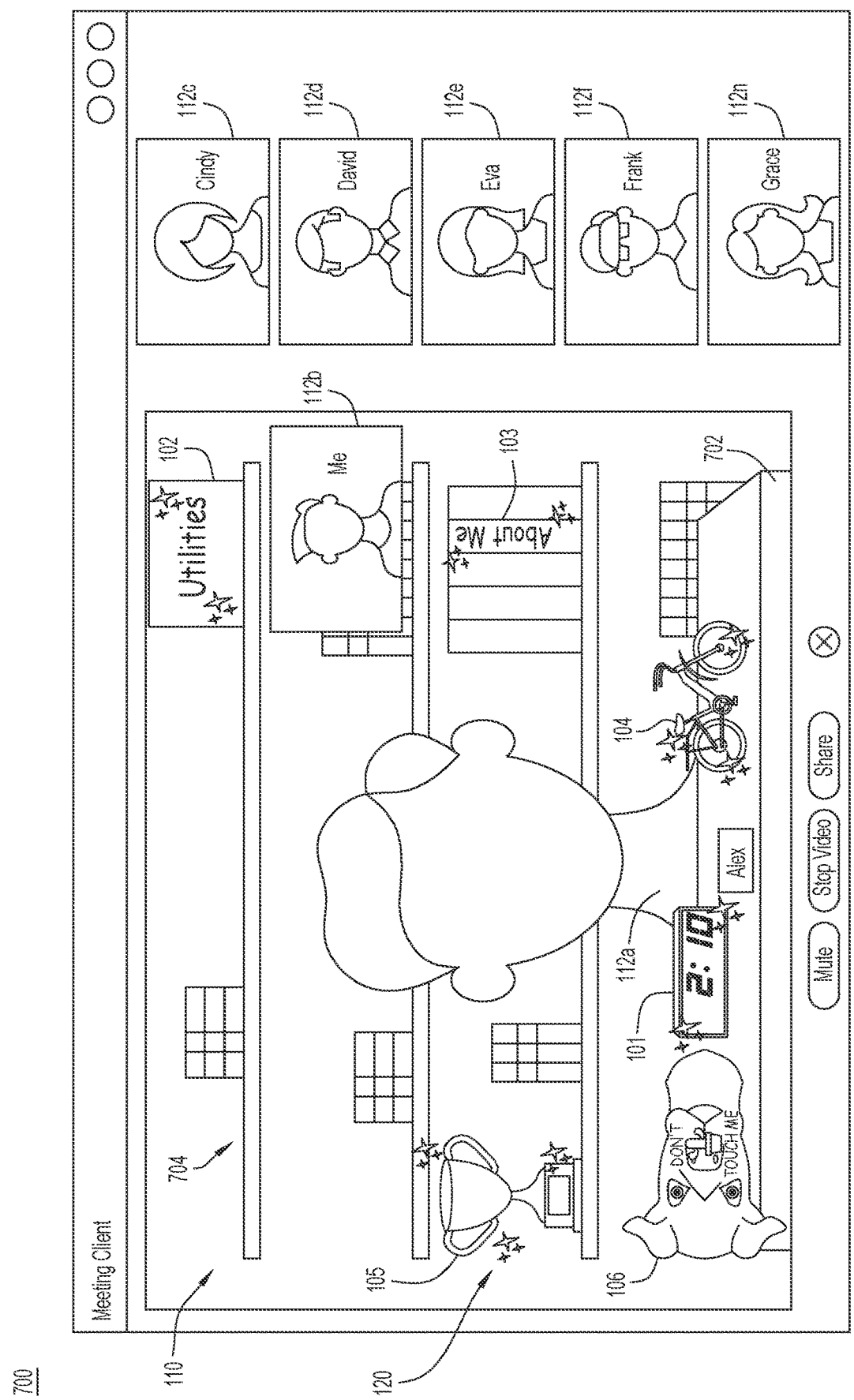
FIG. 7 is a diagram illustrating a collaboration session in which various customized graphical items are arranged in a foreground and a background of a collaboration space based on contextual analysis of the collaboration space, according to an example embodiment.

FIG. 7 is a diagram illustrating a collaboration session 700 in which various customized graphical items are arranged in a foreground and a background of a collaboration space 110 based on contextual analysis of the collaboration space 110, according to an example embodiment.

In one or more example embodiments, the collaboration server and/or the client application executing on a respective user device of the first participant 112a analyzes the collaboration space 110 based on a media stream of the collaboration session 700. For example, the collaboration server performs image recognition, object detection, optical character recognition (OCR), etc. to detect various objects in the collaboration space 110. For example, the collaboration server detects a table in a foreground 702 of the collaboration space 110 and a bookcase in a background 704. The collaboration server determines the location for each of the customized graphical items 101-106 based on this contextual analysis. In the collaboration session 700, some of the customized graphical items 101-106 are placed on the table (the timer 101, the contextual model 104, and the surprise icon 106) while others on the bookcase (the utilities tool box 102, the profile 103, and the trophy icon 105).

The location is determined such that the customized graphical items 101-106 blend into the collaboration space 110. For example, there is more space in the foreground 702 to place a large-sized graphical item. As another example, a graphical item may be placed on a bookshelf in the background 704 so as to not appear as hanging in the air. In other words, based on the contextual analysis of the collaboration space 110 in the collaboration session 700, default locations for the customized graphical items 101-106 are determined such as to appear natural (as part or blend into) in the collaboration space 110. Further, based on the contextual analysis of the collaboration space 110, size and shape of the customized graphical items may be adjusted to blend into the collaboration space 110.

The first participant 112a may further change the location of a graphical item e.g., via a drag-and-drop action. The locations of the customized graphical items 101-106 vary in different deployments and use case scenarios. Same customized graphical item may be located in the foreground in a first collaboration space and in the background in a second collaboration space. The location is defined by the respective participant and/or based on the contextual analysis of the collaboration space 110.

Further, some of the customized graphical items 101-106 may be selected by the owner (the first participant 112a). Since the location of the customized graphical items 101-16 blend into the collaboration space 110, a graphical item may be selected based on movement(s) of the first participant 112a (the owner) such as taking a book from a bookcase.

Figure 8:
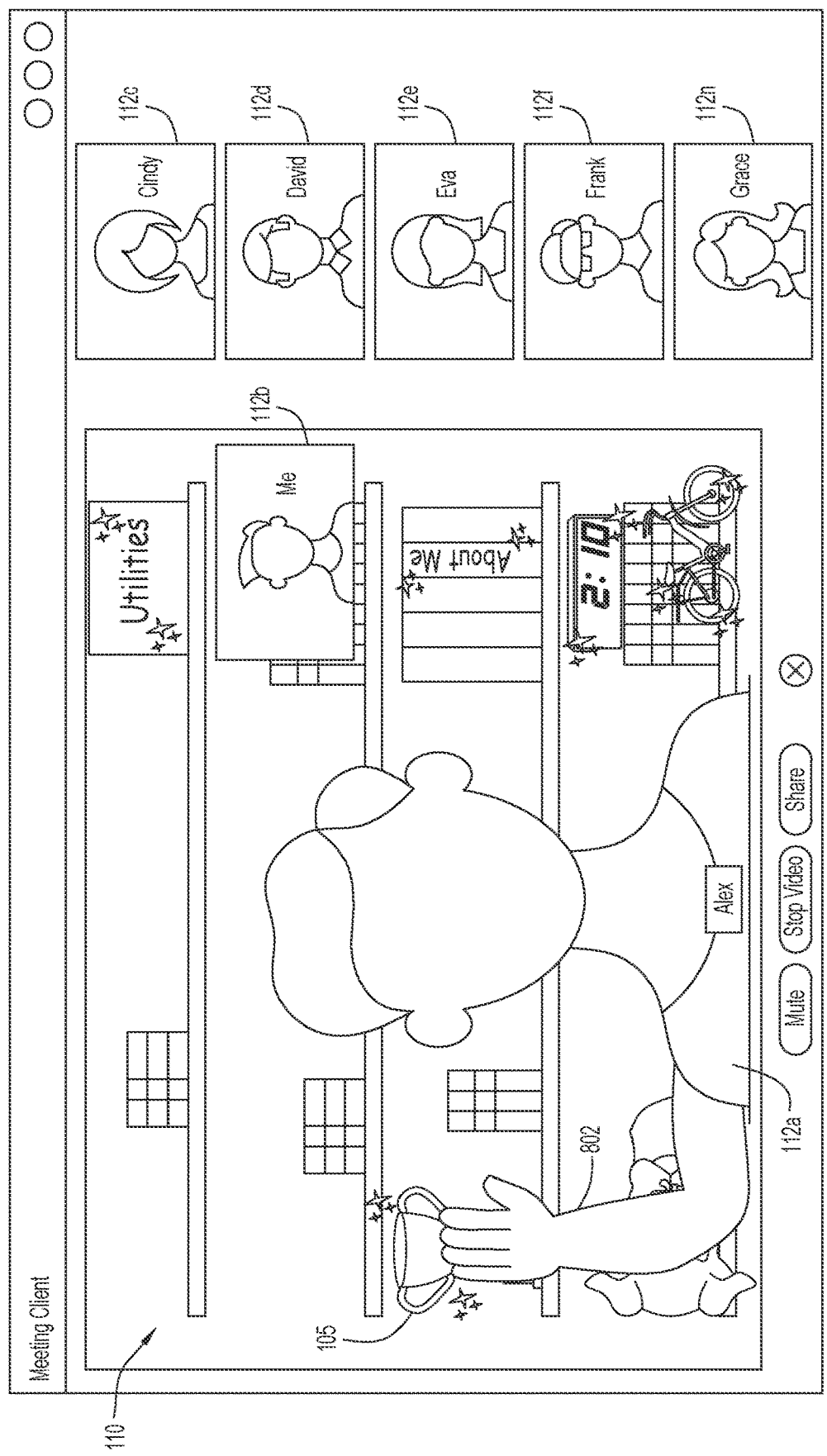
FIG. 8 is a diagram illustrating a collaboration session in which a graphical item is selected in a collaboration space based on a detected movement of the participant toward the graphical item, according to an example embodiment.

With continued reference to FIG. 1, FIG. 8 is a diagram illustrating a collaboration session 800 in which a graphical item is selected in a collaboration space of a participant based on detected movements of the first participant 112a toward a graphical item, according to an example embodiment.

In the collaboration session 800, the first participant 112a selects the trophy icon 105 in the collaboration space 110 using movements. Specifically, the first participant 112a stretches his arm 802 to reach and grab the trophy icon 105 on the bookcase. The body language of stretching the arm and finer operations such as grabbing the trophy icon 105 with fingers are detected and recognized by the client application (executing on the respective user device) as an action of selecting the trophy icon 105. As such, the first participant 112a triggers one or more events via performing physical movements during the collaboration session 800.

Figure 9A:
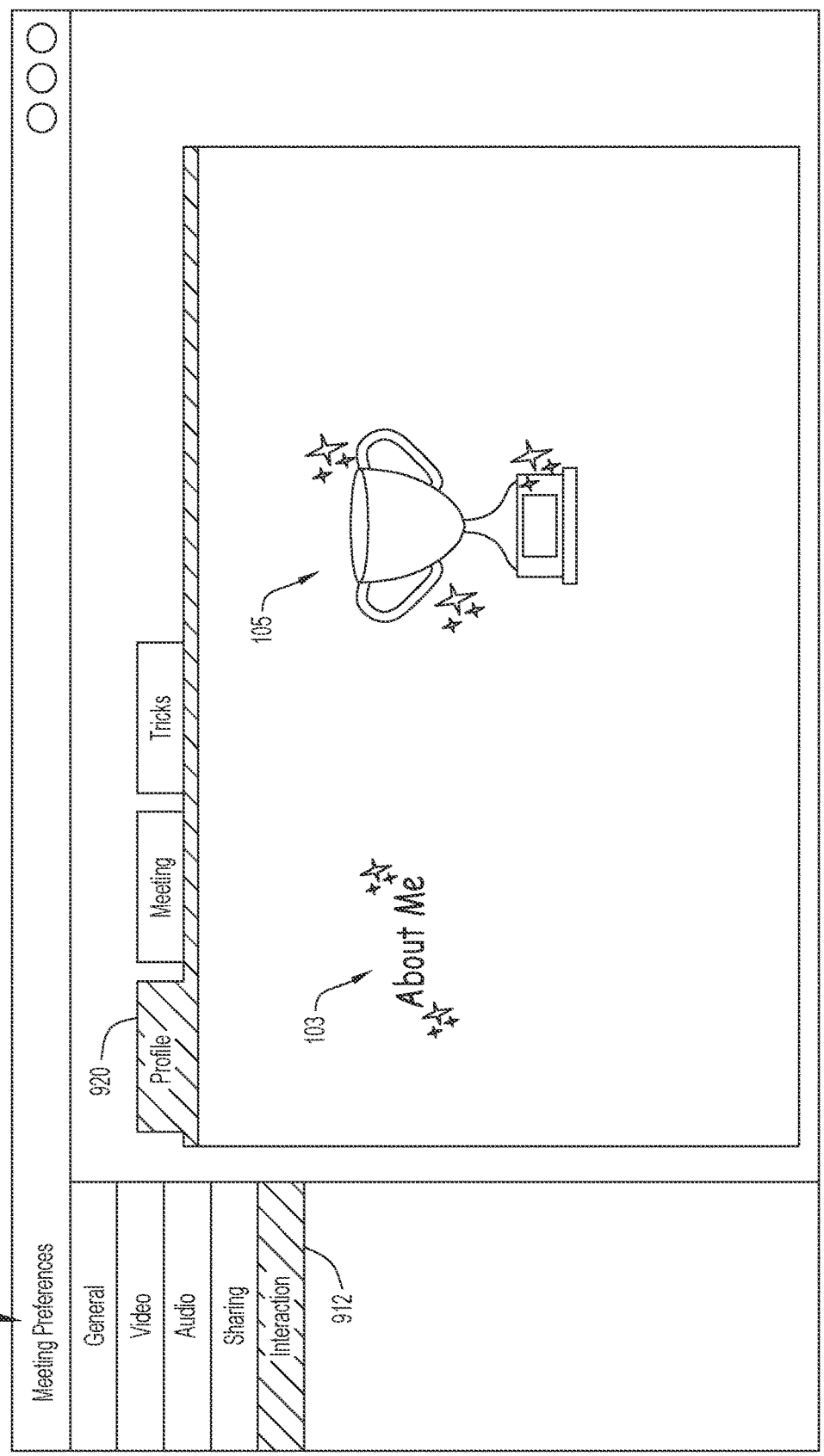
FIGS. 9A-9C are diagrams illustrating an embedded application configured to generate customized graphical items, according to an example embodiment.
Figure 9B:
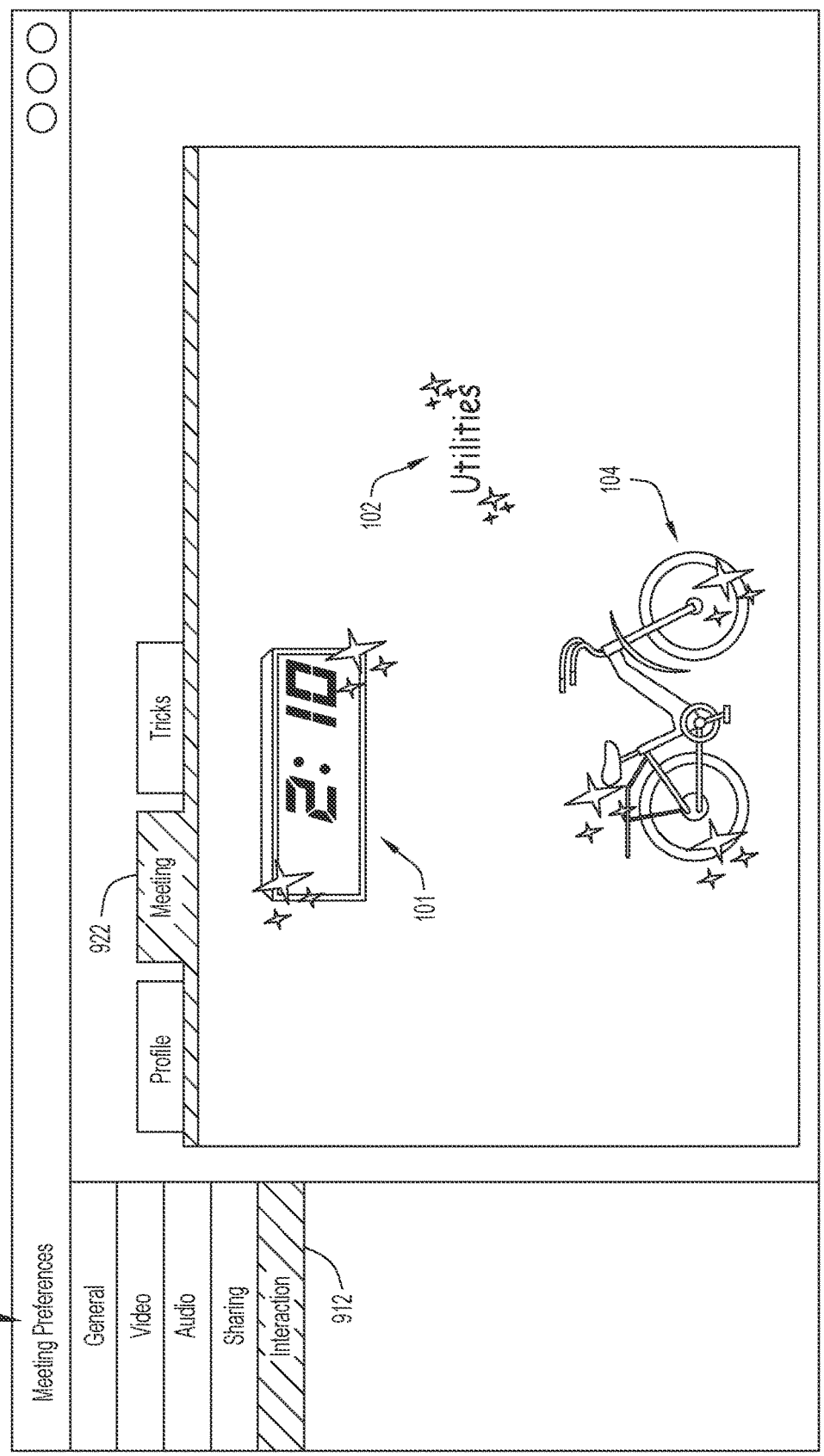
Figure 9C:
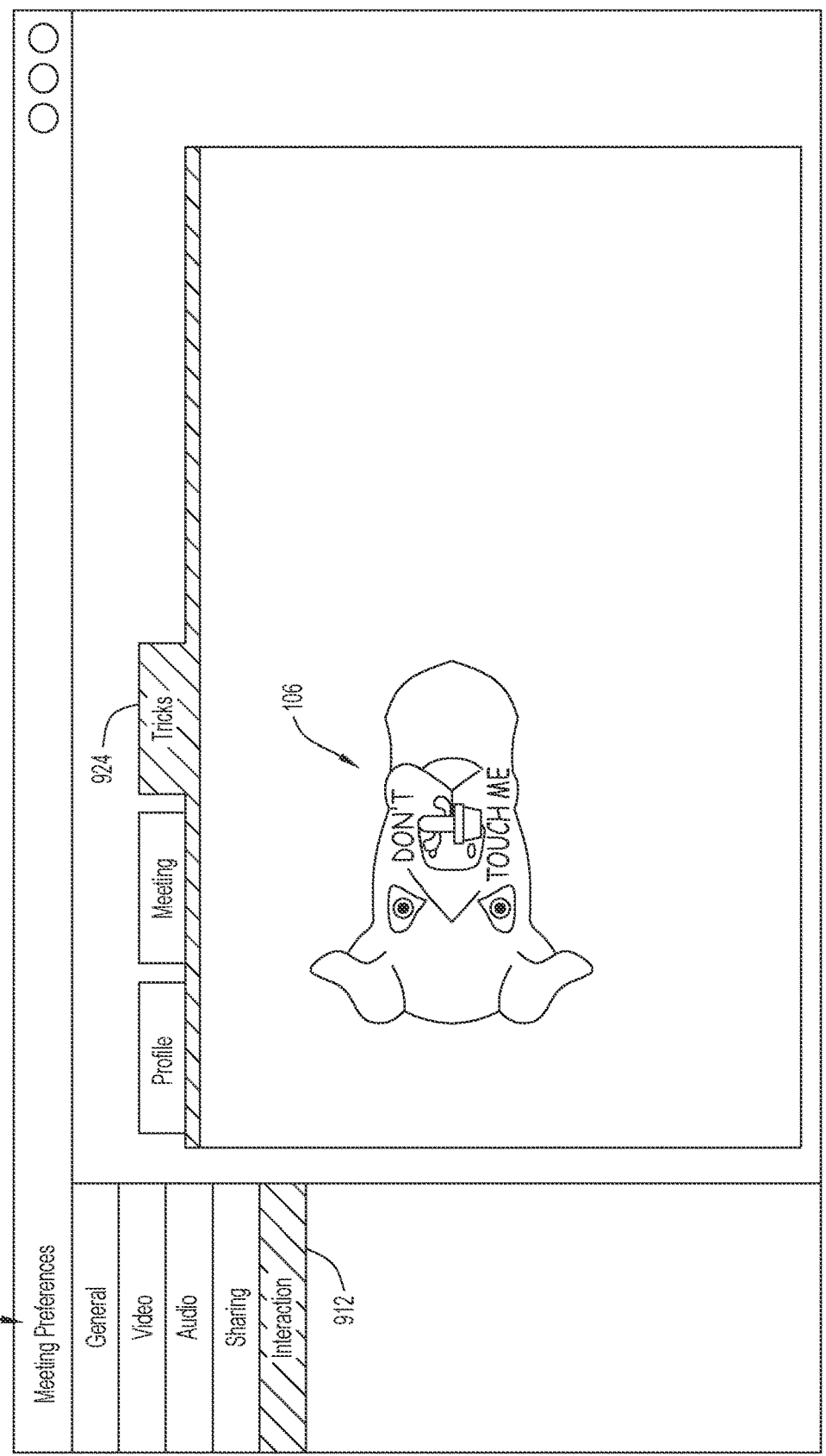
Figure 10:
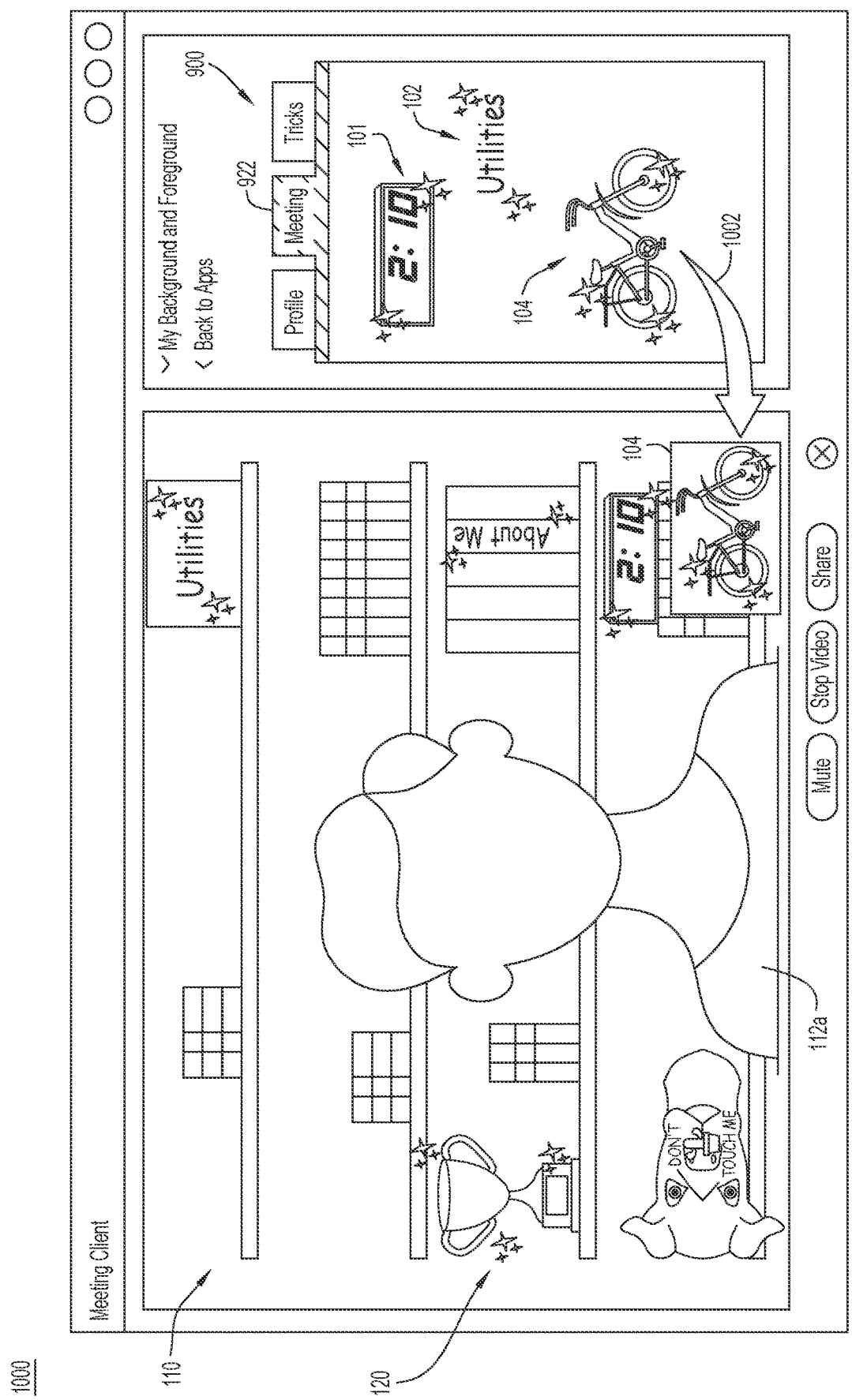
FIG. 10 is a diagram illustrating a collaboration session in which one or more graphical items are selected, from the embedded application, via drag and drop action, for a collaboration space of a participant, according to an example embodiment.

FIGS. 9A-9C are diagrams illustrating an embedded application 900 configured to generate customized graphical items 101-106, according to an example embodiment.

The embedded application 900 is executed on a respective user device and is integrated with the client application that is configured to provide a collaboration session. The embedded application 900 provides for background and/or foreground customization. The embedded application 900 allows the respective participant to set up various meeting materials that are to be associated with the participant profile under interactions 912 of meeting preferences 910 associated with the user profile.

The embedded application 900 generates and stores the customized graphical items 101-106. The customized graphical items 101-106 are stored under various categories/types such as but not limited to a participant profile 920, meeting related material 922, and tricks 924.

Specifically, the participant profile 920 in FIG. 9A includes the profile 103 and the trophy icon 105. The meeting related material 922 in FIG. 9B includes the timer 101, the utilities tool box 102, and the contextual model 104. The tricks 924 includes the surprise icon 106. These are but some examples. Any items may be setup and could be icons, texts, images, etc.

The participant further sets up or configures one or more actions for the item that another participant of a collaboration session may select. The actions associated with various items may include preferences for a background, avatars, augmented reality (AR) overlays, etc. The actions may be complex such as triggering one or more conditions, access controls, general-purpose scripts, and/or template behavior in the collaboration session itself. For example, the actions may include adding a name tag, a costume, a mask, etc. to the participant that selected the item and having this participant wave his hand to say "hello", moving this participant into the collaboration space, etc. The embedded application 900, dedicated to the background/foreground customization, is flexible and extensible.

With continued reference to FIGS. 1 and 9A-9C, FIG. 10 is a diagram illustrating a collaboration session 1000 in which one or more customized graphical items 101-106 are selected, from the embedded application 900, via drag and drop action, for a collaboration space 110 of a first participant 112a, according to an example embodiment.

The embedded application 900 may be used during the collaboration session 1000 or before the collaboration session 1000 such as during the initial setup in preparation for the collaboration session 1000.

The first participant 112a may perform an operation such as drag-and-drop 1002 of a customized graphical item (the contextual model 104) from the embedded application 900 to a background or a foreground of the collaboration space 110.

The location of the selected customized graphical item may be where the participant dropped the item or it may further be adjusted based on the contextual analysis of the collaboration space 110, as explained above. In addition to having a virtual background, the collaboration space 110 may have a virtual foreground, which is then used for the customized graphical item(s).

In one or more example embodiment, the customized graphical items may be created and configured in the embedded application 900 (with or without the meeting client application executing on a respective user device). Further, some default graphical items such as a countdown timer, a clock showing user's local time may be provided by the embedded application 900 with various choices of style, size, color, etc.

In one example embodiment, a collaboration space of a collaboration session may be a virtual 3D background having a cabinet therein. One of the participants selects the cabinet (by clicking or actual movement by the owner). In response thereto, a 3D animation may be played in the collaboration session in which the cabinet door is opened and the documents are flying out of the cabinet.

In one example embodiment, the customized graphical items may be shared among participants. For example, a first participant selects a graphical item from the embedded application 900 and places it in the respective collaboration space 110. During a collaboration session, a second participant selects the graphical item from the respective collaboration space 110 and drags and drops it into its respective embedded application 900.

The actions associated with a customized graphical item may vary depending on the participant such as when the owner selects the customized graphical item, content related documents are provided but when another participant selects the customized graphical item, only some of the content related documents are provided. As another example, when a customized graphical item is selected and manipulated by an owner participant, the item is shared with all participants of the collaboration session but when this item is selected by non-owner participant, this item is viewed privately by the non-owner participant. The view and actions associated with this selected item is not shared with other participants of the collaboration session. The non-owner participant may be provided with an option to share the selected item and the associated actions with other participants. For example, the non-owner participant selects the contextual model 104, modifies it, and then clicks a button or selects an option to share the modified contextual model with others. When the non-owner participant's view of the customized item is shared, all participant view this customized item.

The techniques explained above facilitate sharing information and collaboration in an online, video collaboration session. The techniques utilize the collaboration space including the background and/or the foreground in a media stream of a participant to provide various customized materials that are associated with various actions. With the proposed method, information is provided in an overlooked section of the collaboration session (background and/or foreground). Further, collaboration is enhanced by associating the customized graphical items with various participant-defined actions. The participants can show their personalities and be more engaged throughout the collaboration session using the interactive collaboration space (background and/or foreground). The participant customizes meeting-related materials in their physical or virtual collaboration space (view) in a natural way so that the other participants in the collaboration session may easily view them and interact with them. The items are blended into the collaboration space using contextual analysis of the collaboration space and items therein.

According to yet another example embodiment, a smart background engine contextually analyzes the collaboration space to detect one or more elements that are contextually relevant to the collaboration session. That is, the smart background engine analyzes a background of one or more views of various participants (their media streams) and detects contextually relevant elements to generate actionable objects therefrom. The actionable objects are then available for the participants during the collaboration session.

Figure 11:
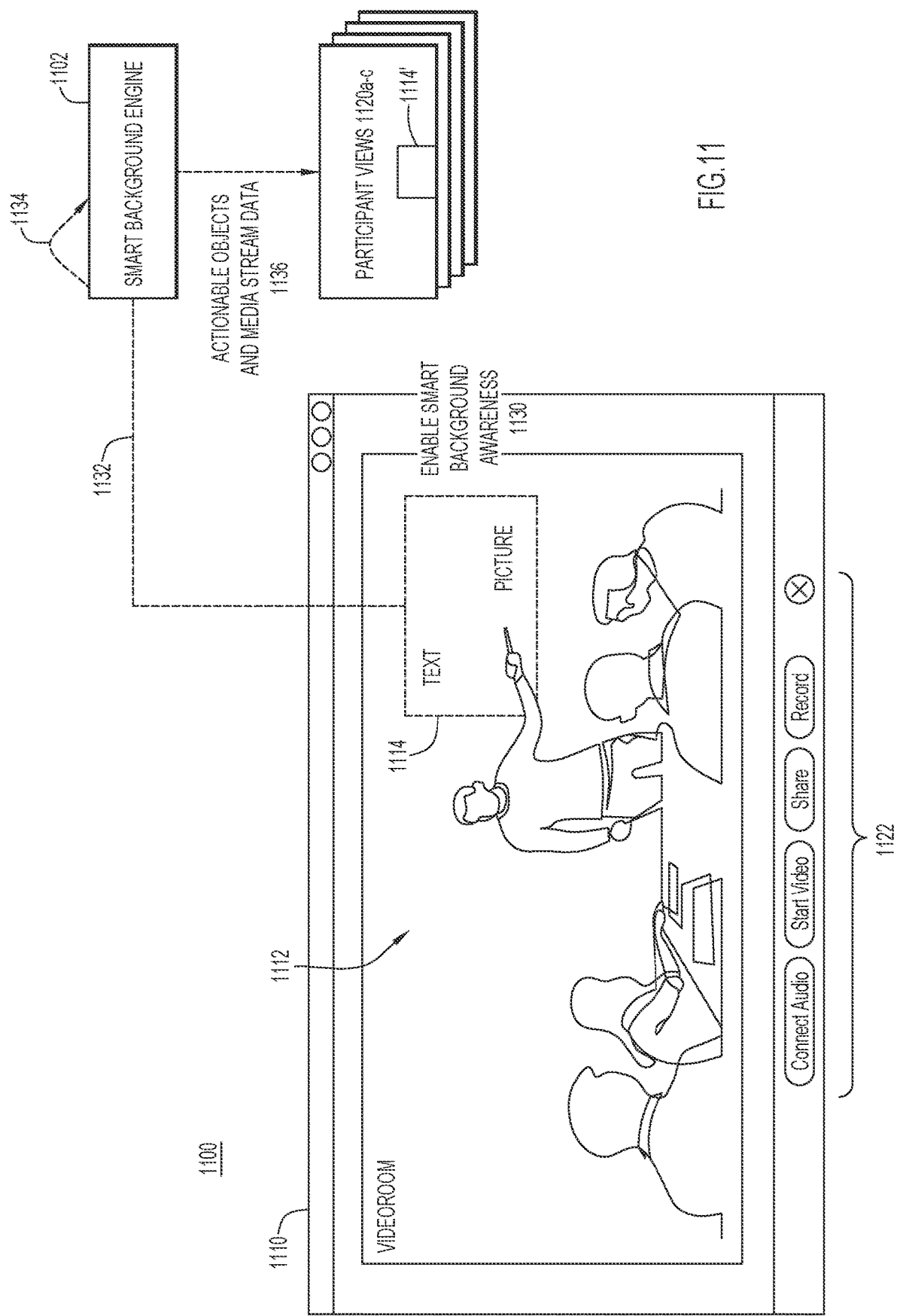
FIG. 11 is a flow diagram illustrating a system in which a smart background engine generates at least one actionable object based on a contextual analysis of a background in a collaboration session, according to an example embodiment.

Specifically, FIG. 11 is a flow diagram illustrating a system 1100 in which a smart background engine 1102 generates at least one actionable object based on a contextual analysis of a background in a collaboration session, according to an example embodiment. The system 1100 includes the smart background engine 1102 that analyzes a collaboration space 1110 and provides actionable objects to the participant views 1120a-c.

Nowadays, collaboration sessions, such as an online video conferencing or meetings, still include analog whiteboards to draw/discuss points and share those via video in a collaboration session. While participants may view the material presented on the analog whiteboards such as text, drawings, images, etc., they cannot interact with this material. In an example embodiment, the smart background engine 1102 detects context relevant content within a collaboration session using contextual analysis and translates the context relevant content into actionable objects.

At 1130, a collaboration server connects at least two participants via their respective devices to a collaboration session. In the collaboration session, a smart background awareness is activated via tools 1122 by one or more of the participants.

At 1132, the media stream of the collaboration session (from one or more participant views 1120a-c) is provided to the smart background engine 1102.

At 1134, the smart background engine 1102 analyzes the video stream(s) shared by various participants via their respective user devices and detects areas or elements in a background 1112 of a collaboration space 1110 with information that could be relevant to the collaboration session and then translates information or elements found therein into usable objects.

For example, some of the participants of a collaboration session are in a collaboration space 1110, which is a meeting room. The background 1112 of the collaboration space 1110 includes a whiteboard 1114. One of the participants is using the whiteboard 1114 to provide content during the collaboration session. The whiteboard 1114 is not integrated into the collaboration session but is in the background 1112. The smart background engine 1102 detects that the content shared on the whiteboard 1114 is of relevance to the participants.

Specifically, the smart background engine 1102 analyzes behavior of the participants and changes in the collaboration space to detect contextually relevant elements. The smart background engine 1102 detects that an active participant is pointing to the whiteboard 1114. The smart background engine 1102 may detect content changing on the whiteboard 1114. The smart background engine 1102 analyzes the media stream data from the participant views 1120a-c to detect movement and changes to the background 1112 of the collaboration space 1110. The smart background engine 1102 may further analyze metadata and/or information available for the collaboration session. For example, the smart background engine 1102 may analyze a meeting agenda, data in the invitation for the meeting, etc., that is provided before the start of the collaboration session to determine whether the whiteboard 1114 includes an element that is contextually relevant. As another example, the smart background engine 1102 may analyze chat or comments made during the collaboration session. As yet another example, the smart background engine 1102 analyzes metadata generated during the collaboration session. In short, the smart background engine 1102 considers available information and metadata related to the collaboration session to determine whether the element is contextually relevant.

The smart background engine 1102 then detects that the whiteboard 1114 is an element that is contextually relevant to the collaboration session. As such, the smart background engine 1102 transforms the element into one or more actionable objects. Specifically, the smart background engine 1102 generates objects that are usable by the participants of the collaboration session. For example, detected text in the whiteboard 1114 is translated into editable text or file such that other participants may modify the text. The detected image/picture is translated into a modifiable picture that may be rotated, changed in size, and further edited. The actionable objects may include one or more of editable file or text, modifiable image that may be manipulated, a link that provides access to a website or a document, or an item (such as an icon) configured to perform one or more action in response to being selected. For example, actions may include opening a particular application, playing a video, or providing a set of documents.

The actionable objects are then integrated or overlaid on the media stream data. At 1136, the smart background engine 1102 distributes the media stream data and actionable objects to the participant views 1120a-c. That is, the smart background engine 1102 integrates the actionable objects into the background 1112. The actionable objects may replace the element that is contextually relevant to the collaboration session. Specifically, the whiteboard 1114 is replaced with a whiteboard 1114' that has editable text, modifiable images, and/or links to additional contextually relevant information. Actionable objects are defined in the background 1112 of any of the participant views 1120a-c.

In one example embodiment, the background 1112 is a physical background. The contextually relevant elements are physical objects found in the physical background using a multimedia stream data of the collaboration session that is shared by the participants. The physical objects may be a company logo, a drawer, etc. The smart background engine 1102 translates the physical objection into an actionable object. For example, one of the participants may select the company logo by clicking it and obtain additional information about the company or may select to open the drawer and obtain content or documents that are to be discussed during the collaboration session.

In yet another example embodiment, the background 1112 is a virtual background. The participants ascribe/publish content/metadata to different virtual objects in a virtual background. This provides a more interactive and entertaining collaboration session. The virtual objects may include training materials, team ice breakers, scavenger hunts, etc. By selecting the virtual objects in the background 1112, the participants obtain associated content or actions.

Additionally, the actionable objects may have various access levels. That is, access to the information shared by the smart background engine 1102 may be restricted to some of the participants using various factors. For example, the role or title of the participant may be used to determine access level to the actionable objects. If a first participant is part of an executive leadership team, all actionable objects of a second participant are available. If the first participant is a senior leader, only some of the actionable objects of the second participant are available. If the first participant is a contractor, then the first participant views the background 1112 with the whiteboard 1114 (contextually relevant element) and none of the actionable objects are provided. As another example, some actionable objects are shared with participant's team and not outside the team.

Actionable objects may vary depending on location of the participant. For example, if a participant is located in Spain, the actionable objects are provided in Spanish and if the participant is located in the United States, the actionable objects are provided in English.

The smart background engine 1102 continuously analyzes the media stream of the collaboration session and uses participant feedback, actions, interactions, and audio feed to translate elements that are contextually relevant into actionable objects and to replace actionable objects that are not of interest to the participants back into elements.

In the techniques presented herein, the smart background engine 1102 autonomously and automatically detects elements that are contextually relevant in a collaboration session from the background 1112 of the collaboration space 1110. The smart background engine 1102 transforms the detected elements (text, images, information, physical objects, or other background details) into actionable objects. Actionable objects may include clickable objects, objects that are translatable into various formats or forms depending on location, background objects with specific actions and access restrictions. The smart background engine 1102 further detects participant feedback and/or interactions to select an actionable object, their interaction with the object, and other statistics such as how many participants selected the actionable object during a collaboration session and provides feedback on how to improve the use of the background 1112 of the collaboration space 1110 to interact with participants. If an actionable object appears no longer relevant (no interaction is detected), the actionable object may be replaced with the element. That is, the actionable object is reverted back/returned to the original corresponding element. The smart background engine 1102 may be executed by one or more collaboration servers and/or client applications on the respective user devices.

Figure 12:
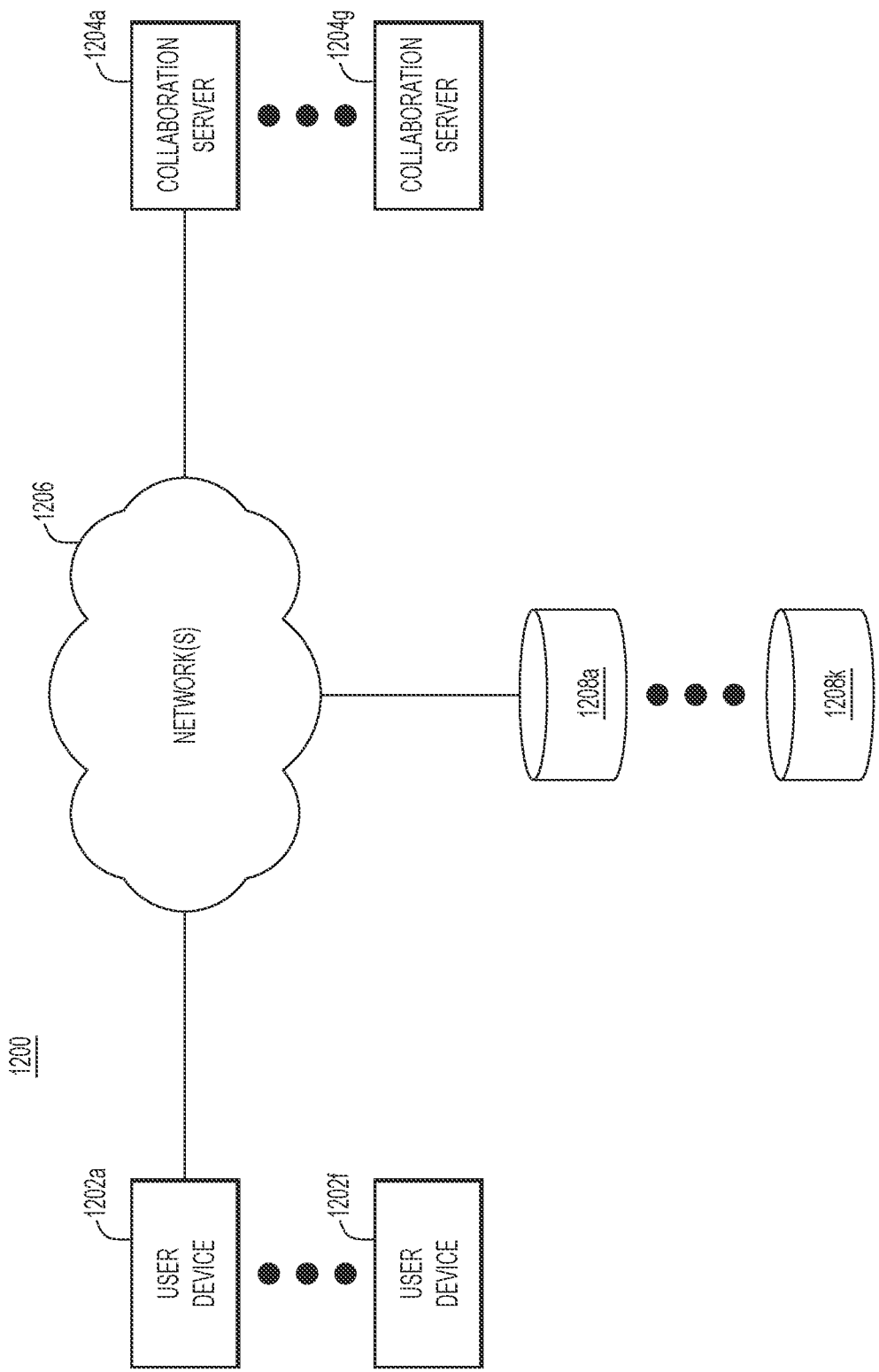
FIG. 12 is a block diagram illustrating a system configured to provide a collaboration session among a plurality of participants, according to one or more example embodiments.

FIG. 12 is a block diagram illustrating a system 1200 for providing a collaboration session among a plurality of participants, according to an example embodiment. The system 1200 includes a plurality of user devices (devices) 1202*a-f*, a plurality of collaboration servers 1204*a-g*, a network (or a collection of networks) 1206, and one or more databases 1208*a-k*.

In the system 1200, one or more users may be participating in a collaboration session using their respective devices 1202*a-f* (depicted as endpoint device 1202*a* and endpoint device 1202*f*), the users are called participants. The collaboration session is managed and/or controlled by the collaboration servers 1204*a-g* (depicted as a first collaboration server 1204*a* and a second collaboration server 1204*g*). The devices 1202*a-f* communicate with the collaboration servers 1204*a-g* via the network(s) 1206.

The one or more networks 1206 may include a local area network (LAN), a wide area network (WAN) such as the Internet, or a combination thereof, and includes wired, wireless, or fiber optic connections. In general, the one or more networks 1206 can use any combination of connections and protocols that support communications between the entities of the system 1200.

In one example embodiment, one or more of the collaboration servers 1204*a-g* may generate and provide customized graphical items and/or actionable objects. In another example embodiment, the devices 1202*a-f* communicate with the collaboration servers 1204*a-g* and retrieve and distribute the graphical items and/or actionable objects from the databases 1208*a-k* to the devices 1202*a-f*. In various example embodiments, the collaboration servers 1204*a-g* control the distribution of graphical items and/or actionable objects to multiple participants along with a media stream of the collaboration session.

The collaboration servers 1204*a-g* store identifiers of various collaboration sessions that may be obtained from the databases 1208*a-k* (one or more memories), depicted as a first database 1208*a* and a second database 1208*k*. The collaboration servers 1204*a-g* are configured to communicate with various client applications executing on the user devices 1202*a-f*. The client applications running on the user devices 1202*a-f* detect various actions performed by the respective participants during a collaboration session and notify the respective collaboration server associated with the collaboration session about these events. The respective collaboration server may render or display, in a collaboration space and/or on a user interface screen of the respective device, one or more graphical items and/or actionable objects of the collaboration session. That is, one of the collaboration servers 1204*a-g* sends commands to the client applications running on the user devices 1202*a-f* to render content in a particular way, to change views, controls, and so on.

The collaboration servers 1204*a-g* control the collaboration sessions by communicating and/or interacting with client applications running on the user devices 1202*a-f* that detect various actions performed by the participants during the collaboration sessions and execute commands and/or instructions for the collaboration sessions as provided by the collaboration servers 1204*a-g*.

Figure 13:
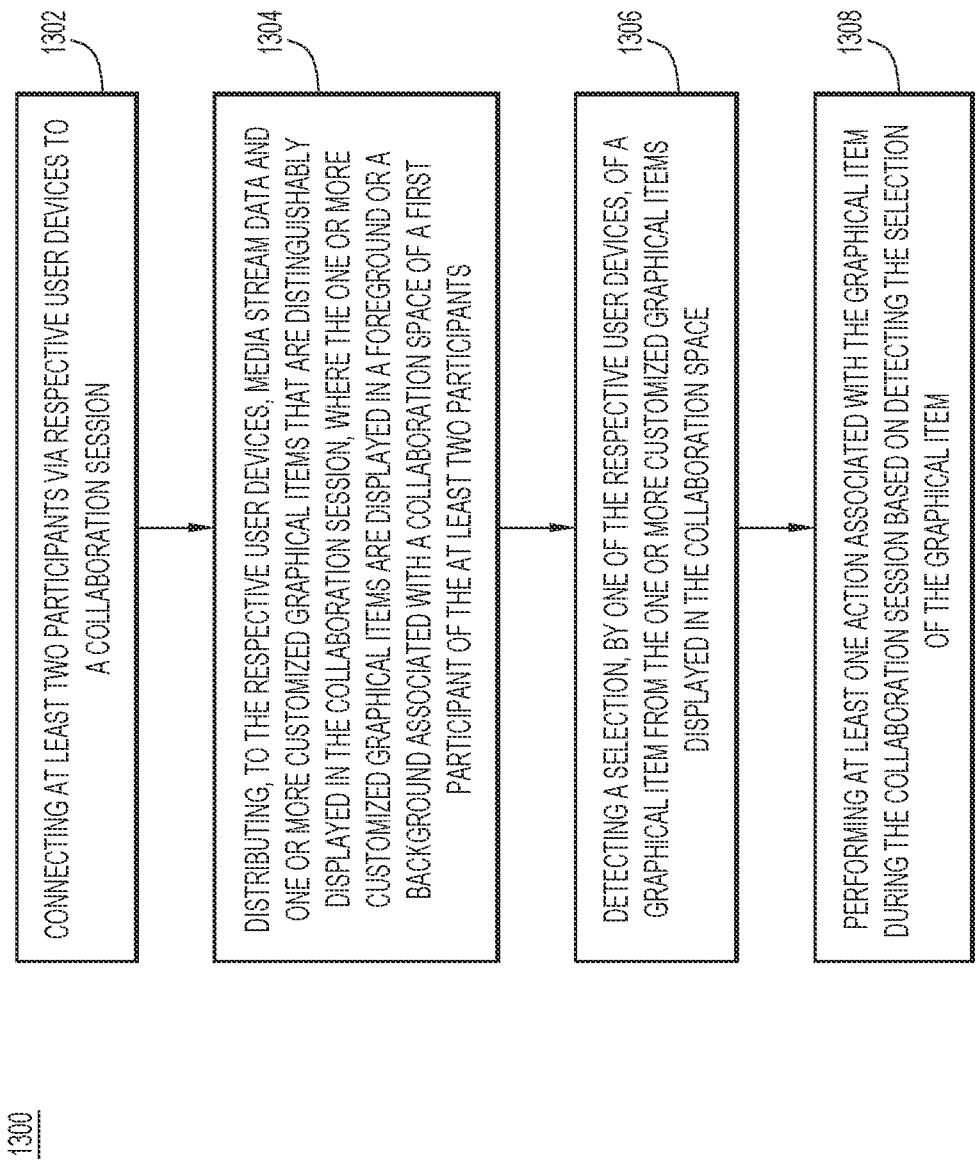
FIG. 13 is a flow diagram illustrating a method of performing an action associated with a customized graphical item during a collaboration session, according to an example embodiment.

FIG. 13 is a flow diagram illustrating a method 1300 of performing an action associated with a customized graphical item during a collaboration session, according to an example embodiment. The method 1300 may be performed by one or more collaboration servers such as the collaboration servers 1204*a-g* of FIG. 12.

The method 1300 involves, at 1302, a collaboration server connecting at least two participants via respective user devices to a collaboration session.

The method 1300 further involves at 1304, the collaboration server distributing, to the respective user devices, media stream data and one or more customized graphical items that are distinguishably displayed in the collaboration session. The one or more customized graphical items are displayed in a foreground or a background associated with a collaboration space of first participant of the at least two participants.

Additionally, the method 1300 involves at 1306, the collaboration server detecting a selection, by one of the respective user devices, of a graphical item from the one or more customized graphical items displayed in the collaboration space and at 1308, the collaboration server performing at least one action associated with the graphical item during the collaboration session based on detecting the selection of the graphical item.

In one or more example embodiments, the method 1300 may further involve performing a contextual analysis of the foreground and the background of the collaboration space of the first participant and determining a location in the foreground or the background for distinguishably displaying each of the one or more customized graphical items based on performing the contextual analysis.

In one form, the foreground and the background of the collaboration space may be a physical space around the first participant and the location is determined such that the one or more customized graphical items blend into the physical space around the first participant.

In one instance, the operation 1308 of performing the at least one action associated with the graphical item may include one or more of: displaying, in the collaboration session, a first user interface with additional information associated with the graphical item or the first participant or displaying, in the collaboration session, a second user interface with contextual information related to the collaboration session.

According to one or more example embodiments, the graphical item may represent the first participant and the additional information may include one or more of a profile of the first participant or personal information about the first participant.

In another form, the graphical item may represent content of the collaboration session and the contextual information may include one or more of: content related tools for the first participant to use for providing content during the collaboration session, a contextual model, a document, or a timer indicating an availability duration of the first participant for the collaboration session.

According to one or more example embodiment, the operation 1306 of detecting the selection of the graphical item from the one or more customized graphical items may include detecting a movement of the first participant in the collaboration session toward the graphical item.

In another instance, the method 1300 may further involve the collaboration server detecting a drag-and-drop action of the graphical item from an embedded application, performed using a respective user device of the first participant and the collaboration server adding the graphical item to the collaboration space based on detecting the drag-and-drop action.

According to one or more example embodiments, the method 1300 may further involve generating the graphical item by defining, using the respective user device of the first participant, one or more of: content, style, size, an interaction to be performed when the graphical item is selected, or an action to be performed when the graphical item is selected.

In one instance, the method 1300 may further involve customizing, via the respective user device of the first participant, the graphical item by defining content and by defining an action to be performed when the graphical item is selected.

Figure 14:
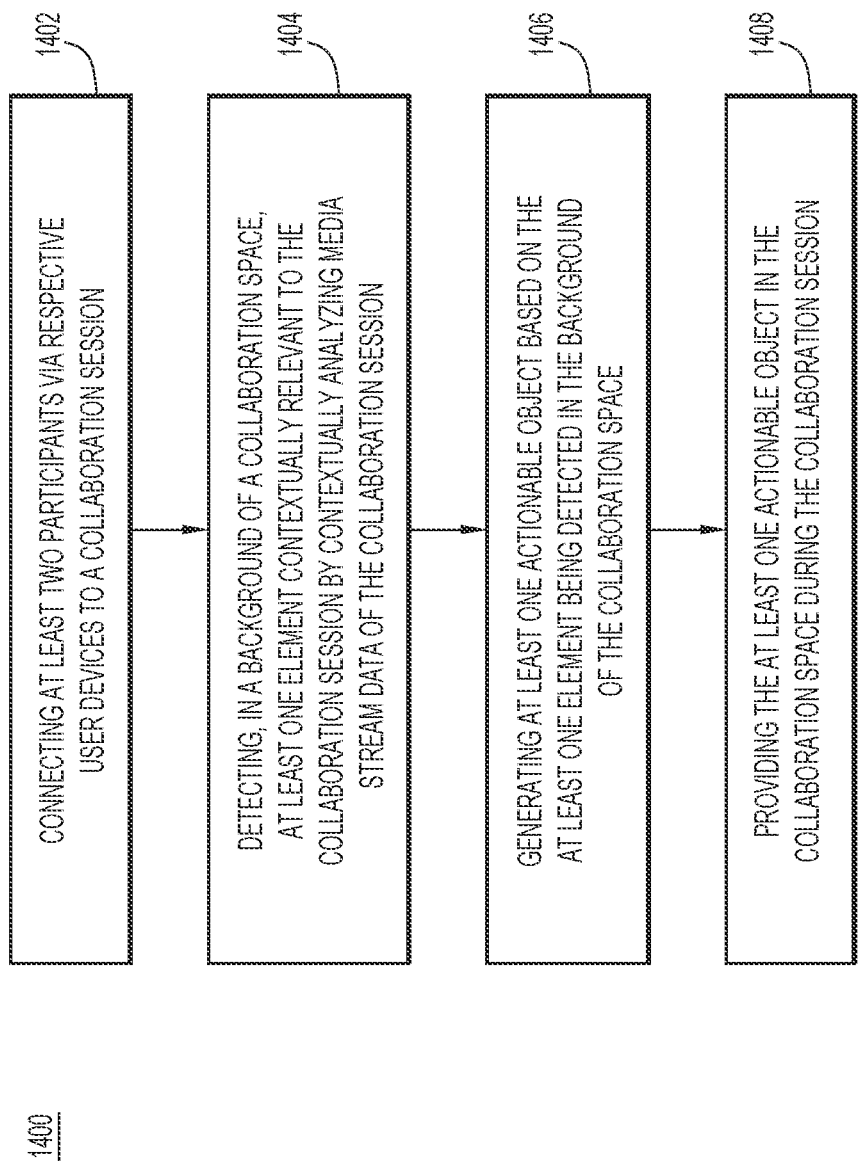
FIG. 14 is a flow diagram illustrating a method of providing an actionable object in a collaboration space during a collaboration session, according to an example embodiment.

FIG. 14 is a flow diagram illustrating a method 1400 of providing an actionable object in a collaboration space during a collaboration session, according to an example embodiment. The method 1400 may be performed by one or more collaboration servers such as the collaboration servers 1204*a-g* of FIG. 12.

The method 1400 involves at 1402, a collaboration server connecting at least two participants via respective user devices to a collaboration session and at 1404, the collaboration server detecting, in a background of a collaboration space, at least one element contextually relevant to the collaboration session by contextually analyzing media stream data of the collaboration session.

The method 1400 further involves at 1406, the collaboration server generating at least one actionable object based on the at least one element being detected in the background of the collaboration space and at 1408, the collaboration server providing the at least one actionable object in the collaboration space during the collaboration session.

In one or more example embodiments, the operation 1404 of detecting in the background of the collaboration space the at least one element may include detecting one or more interactions of the at least two participants with the at least one element and detecting changes in the background of the collaboration space during the collaboration session.

In one form, the operation 1406 of generating the at least one actionable object may include one or more of: transforming a respective element into a respective actionable object that is capable of being modified by one or more of the at least two participants via the respective user devices or associating at least one action to the at least one element, wherein the at least one action is performed based on a selection of the respective actionable object.

In one instance, the operation 1408 of providing the at least one actionable object in the collaboration space during the collaboration session may include replacing the respective element with the actionable object in the background of the collaboration space during the collaboration session.

According to one or more example embodiments, the method 1400 may further involve detecting one or more interactions with the actionable object and based on the one or more interactions with the actionable object, modifying the background of the collaboration space to include the actionable object that is modified based on the one or more interactions or to return to displaying the respective element.

In another form, the operation 1408 of providing the at least one actionable object in the collaboration space during the collaboration session may be based on an access level of a respective participant of the at least two participants.

Figure 15:
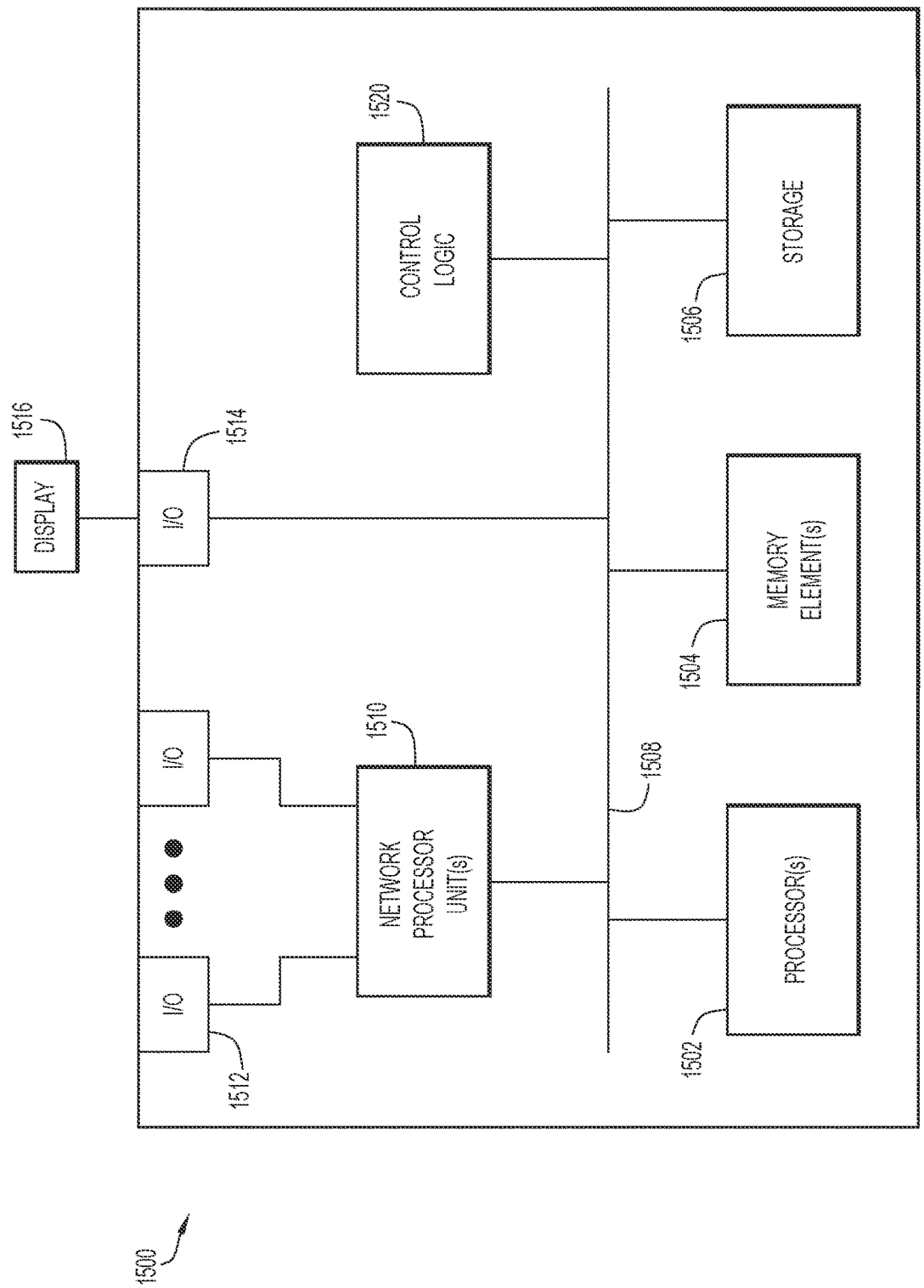
FIG. 15 is a hardware block diagram of a computing device that may perform functions associated with any combination of operations in connection with the techniques depicted and described in FIGS. 1-14, according to various example embodiments.

FIG. 15 is a hardware block diagram of a computing device 1500 that may perform functions associated with any combination of operations in connection with the techniques depicted in FIGS. 1-14, according to various example embodiments, including, but not limited to, operations of the one or more user devices 1202*a-f* or one or more collaboration servers 1204*a-g* that are shown in FIG. 12. Further, the computing device 1500 may be representative of a smart background engine 1102 shown in FIG. 11. It should be appreciated that FIG. 15 provides only an illustration of one example embodiment and does not imply any limitations with regard to the environments in which different example embodiments may be implemented. Many modifications to the depicted environment may be made.

In at least one embodiment, computing device 1500 may include one or more processor(s) 1502, one or more memory element(s) 1504, storage 1506, a bus 1508, one or more network processor unit(s) 1510 interconnected with one or more network input/output (I/O) interface(s) 1512, one or more I/O interface(s) 1514, and control logic 1520. In various embodiments, instructions associated with logic for computing device 1500 can overlap in any manner and are not limited to the specific allocation of instructions and/or operations described herein.

In at least one embodiment, processor(s) 1502 is/are at least one hardware processor configured to execute various tasks, operations and/or functions for computing device 1500 as described herein according to software and/or instructions configured for computing device 1500. Processor(s) 1502 (e.g., a hardware processor) can execute any type of instructions associated with data to achieve the operations detailed herein. In one example, processor(s) 1502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1504 and/or storage 1506 is/are configured to store data, information, software, and/or instructions associated with computing device 1500, and/or logic configured for memory element(s) 1504 and/or storage 1506. For example, any logic described herein (e.g., control logic 1520) can, in various embodiments, be stored for computing device 1500 using any combination of memory element(s) 1504 and/or storage 1506. Note that in some embodiments, storage 1506 can be consolidated with one or more memory elements 1504 (or vice versa), or can overlap/exist in any other suitable manner.

In at least one embodiment, bus 1508 can be configured as an interface that enables one or more elements of computing device 1500 to communicate in order to exchange information and/or data. Bus 1508 can be implemented with any architecture designed for passing control, data and/or information between processors, memory elements/storage, peripheral devices, and/or any other hardware and/or software components that may be configured for computing device 1500. In at least one embodiment, bus 1508 may be implemented as a fast kernel-hosted interconnect, potentially using shared memory between processes (e.g., logic), which can enable efficient communication paths between the processes.

In various embodiments, network processor unit(s) 1510 may enable communication between computing device 1500 and other systems, entities, etc., via network I/O interface(s) 1512 to facilitate operations discussed for various embodiments described herein. In various embodiments, network processor unit(s) 1510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1512 can be configured as one or more Ethernet port(s), Fibre Channel ports, and/or any other I/O port(s) now known or hereafter developed. Thus, the network processor unit(s) 1510 and/or network I/O interface(s) 1512 may include suitable interfaces for receiving, transmitting, and/or otherwise communicating data and/or information in a network environment.

I/O interface(s) 1514 allow for input and output of data and/or information with other entities that may be connected to computing device 1500. For example, I/O interface(s) 1514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1516, a display screen, or the like.

In various embodiments, control logic 1520 can include instructions that, when executed, cause processor(s) 1502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform operations including connecting at least two participants via respective user devices to a collaboration session. The operations further include distributing, to the respective user devices, media stream data and one or more customized graphical items that are distinguishably displayed in the collaboration session. The one or more customized graphical items are displayed in a foreground or a background associated with a collaboration space of a first participant of the at least two participants. The operations further include detecting a selection, by one of the respective user devices, of a graphical item from the one or more customized graphical items displayed in the collaboration space and performing at least one action associated with the graphical item during the collaboration session based on detecting the selection of the graphical item.

In yet another example embodiment, an apparatus is provided. The apparatus includes a memory, a network interface configured to enable network communications, and a processor. The processor is configured to perform operations including connecting at least two participants via respective user devices to a collaboration session and detecting, in a background of a collaboration space, at least one element contextually relevant to the collaboration session by contextually analyzing media stream data of the collaboration session. The operations further include generating at least one actionable object based on the at least one element being detected in the background of the collaboration space and providing the at least one actionable object in the collaboration space during the collaboration session.

In yet another example embodiment, one or more non-transitory computer readable storage media encoded with instructions are provided. When the media is executed by a processor, the instructions cause the processor to execute a method that includes a collaboration server connecting at least two participants via respective user devices to a collaboration session and the collaboration server distributing, to the respective user devices, media stream data and one or more customized graphical items that are distinguishably displayed in the collaboration session. The one or more customized graphical items are displayed in a foreground or a background associated with a collaboration space of a first participant of the at least two participants. The method further includes the collaboration server detecting a selection, by one of the respective user devices, of a graphical item from the one or more customized graphical items displayed in the collaboration space and performing at least one action associated with the graphical item during the collaboration session based on detecting the selection of the graphical item.

In yet another example embodiment, one or more non-transitory computer readable storage media encoded with instructions are provided. When the media is executed by a processor, the instructions cause the processor to execute another method that involves a collaboration server connecting at least two participants via respective user devices to a collaboration session and the collaboration server detecting, in a background of a collaboration space, at least one element contextually relevant to the collaboration session by contextually analyzing media stream data of the collaboration session. The method further involves the collaboration server generating at least one actionable object based on the at least one element being detected in the background of the collaboration space and the collaboration server providing the at least one actionable object in the collaboration space during the collaboration session.

In yet another example embodiment, a system is provided that includes the devices and operations explained above with reference to FIGS. 1-15.

The programs described herein (e.g., control logic 1520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1506 and/or memory elements(s) 1504 can store data, software, code, instructions (e.g., processor instructions), logic, parameters, combinations thereof, and/or the like used for operations described herein. This includes the storage 1506 and/or memory elements(s) 1504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of, 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   connecting, by a collaboration server, at least two participants via respective user devices to a collaboration session;
   distributing, by the collaboration server to the respective user devices, media stream data and one or more customized graphical items that are distinguishably displayed in the collaboration session, wherein the one or more customized graphical items are displayed in a foreground or a background associated with a collaboration space of a first participant of the at least two participants and wherein the one or more customized graphical items are defined by the first participant, via a respective user device, using an embedded application that provides a view that includes a plurality of customized graphical items selectable by the first participant for the collaboration space, and the embedded application further provides for setting at least one action to be performed based on a selection of a graphical item from the one or more customized graphical items displayed in the collaboration space;
   detecting, by the collaboration server, the selection, by one of the respective user devices, of the graphical item from the one or more customized graphical items displayed in the collaboration space; and
   performing the at least one action associated with the graphical item during the collaboration session based on detecting the selection of the graphical item.

2. The method of claim 1, further comprising:
   performing a contextual analysis of the foreground and the background of the collaboration space of the first participant; and
   determining a location in the foreground or the background for distinguishably displaying each of the one or more customized graphical items based on performing the contextual analysis and based on a type of a respective customized graphical item.

3. The method of claim 2, wherein the foreground and the background of the collaboration space is a physical space around the first participant and the location is determined such that the one or more customized graphical items blend into the physical space around the first participant.

4. The method of claim 1, wherein performing the at least one action associated with the graphical item includes one or more of:
   displaying, in the collaboration session, a first user interface with additional information associated with the graphical item or the first participant; or
   displaying, in the collaboration session, a second user interface with contextual information related to the collaboration session.

5. The method of claim 4, wherein the graphical item represents the first participant and the additional information includes one or more of:
   a profile of the first participant or personal information about the first participant.

6. The method of claim 4, wherein the graphical item represents content of the collaboration session and the contextual information includes one or more of: content related tools for the first participant to use for providing the content during the collaboration session, a contextual model, a document, or a timer indicating an availability duration of the first participant for the collaboration session.

7. The method of claim 1, wherein detecting the selection of the graphical item from the one or more customized graphical items includes:
  detecting a movement of the first participant in the collaboration session toward the graphical item.

8. The method of claim 1, further comprising:
  detecting, by the collaboration server, a drag-and-drop action of the graphical item from the embedded application into the collaboration space, performed using the respective user device of the first participant; and
  adding, by the collaboration server, the graphical item to the collaboration space based on detecting the drag-and-drop action.

9. The method of claim 8, further comprising:
  generating the graphical item by further defining, using the respective user device of the first participant, one or more of: content, style, size, and at least two different actions that are sequentially performed with respect to one another when the graphical item is selected during the collaboration session.

10. The method of claim 8, further comprising:
  customizing, via the respective user device of the first participant, the graphical item by defining content to be displayed based on the selection of the graphical item.

11. The method of claim 1, further comprising:
  copying the graphical item of the first participant by another participant of the at least two participants by dragging and dropping the graphical item from the collaboration space of the first participant during the collaboration session into the embedded application associated with the another participant.

12. An apparatus comprising:
  a memory;
  a network interface configured to enable network communications; and
  a processor, wherein the processor is configured to perform operations comprising:
    connecting at least two participants via respective user devices to a collaboration session;
    distributing, to the respective user devices, media stream data and one or more customized graphical items that are distinguishably displayed in the collaboration session, wherein the one or more customized graphical items are displayed in a foreground or a background associated with a collaboration space of a first participant of the at least two participants and wherein the one or more customized graphical items are defined by the first participant, via a respective user device, using an embedded application that provides a view that includes a plurality of customized graphical items selectable by the first participant for the collaboration space, and the embedded application further provides for setting of at least one action to be performed based on a selection of a graphical item from the one or more customized graphical items displayed in the collaboration space;
    detecting the selection, by one of the respective user devices, of the graphical item from the one or more customized graphical items displayed in the collaboration space; and
    performing the at least one action associated with the graphical item during the collaboration session based on detecting the selection of the graphical item.

13. The apparatus of claim 12, wherein the processor is further configured to perform additional operations comprising:
  performing a contextual analysis of the foreground and the background of the collaboration space of the first participant; and
  determining a location in the foreground or the background for distinguishably displaying each of the one or more customized graphical items based on performing the contextual analysis.

14. The apparatus of claim 13, wherein the foreground and the background of the collaboration space is a physical space around the first participant and the location is determined such that the one or more customized graphical items blend into the physical space around the first participant.

15. One or more non-transitory computer readable storage media encoded with software comprising computer executable instructions that, when executed by a processor, cause the processor to perform operations including:
  connecting at least two participants via respective user devices to a collaboration session;
  distributing, to the respective user devices, media stream data and one or more customized graphical items that are distinguishably displayed in the collaboration session, wherein the one or more customized graphical items are displayed in a foreground or a background associated with a collaboration space of a first participant of the at least two participants and wherein the one or more customized graphical items are defined by the first participant, via a respective user device, using an embedded application that provides a view that includes a plurality of customized graphical items selectable by the first participant for the collaboration space, and the embedded application further provides for setting at least one action to be performed based on a selection of a graphical item from the one or more customized graphical items displayed in the collaboration space;
  detecting the selection, by one of the respective user devices, of the graphical item from the one or more customized graphical items displayed in the collaboration space; and
  performing the at least one action associated with the graphical item during the collaboration session based on detecting the selection of the graphical item.

16. The one or more non-transitory computer readable storage media according to claim 15, wherein the computer executable instructions cause the processor to perform:
  performing a contextual analysis of the foreground and the background of the collaboration space of the first participant; and
  determining a location in the foreground or the background for distinguishably displaying each of the one or more customized graphical items based on performing the contextual analysis.

17. The one or more non-transitory computer readable storage media according to claim 16, wherein the foreground and the background of the collaboration space is a physical space around the first participant and the location is determined such that the one or more customized graphical items blend into the physical space around the first participant.

18. The one or more non-transitory computer readable storage media according to claim 15, wherein the computer executable instructions cause the processor to perform the at least one action associated with the graphical item by one or more of:
  displaying, in the collaboration session, a first user interface with additional information associated with the graphical item or the first participant; or displaying, in the collaboration session, a second user interface with contextual information related to the collaboration session.

19. The one or more non-transitory computer readable storage media according to claim 18, wherein the graphical item represents the first participant and the additional information includes one or more of:

a profile of the first participant or personal information about the first participant.

20. The one or more non-transitory computer readable storage media according to claim 18, wherein the graphical item represents content of the collaboration session and the contextual information includes a timer indicating an availability duration of the first participant for the collaboration session and one or more of:

content related tools for the first participant to use for providing content during the collaboration session,
a contextual model, or
a document.

\* \* \* \* \*